(12) United States Patent
Yonezawa et al.

(10) Patent No.: US 7,974,186 B2
(45) Date of Patent: Jul. 5, 2011

(54) CONNECTION RECOVERY DEVICE, METHOD AND COMPUTER-READABLE MEDIUM STORING THEREIN PROCESSING PROGRAM

(75) Inventors: Takeo Yonezawa, Kawasaki (JP); Kuniyuki Hatakeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 12/458,602

(22) Filed: Jul. 16, 2009

(65) Prior Publication Data

US 2010/0014418 A1    Jan. 21, 2010

(30) Foreign Application Priority Data

Jul. 17, 2008    (JP) ................. 2008-185493
Mar. 19, 2009    (JP) ................. 2009-068483

(51) Int. Cl.
*G06F 11/00* (2006.01)
(52) U.S. Cl. ........ 370/225; 370/217; 370/221; 709/223; 709/227; 709/238; 714/4; 714/11
(58) Field of Classification Search .................. None
See application file for complete search history.

(56) References Cited

U.S. PATENT DOCUMENTS

| | | | | |
|---|---|---|---|---|
| 7,716,523 | B2 * | 5/2010 | Shah et al. ................ | 714/15 |
| 2003/0005350 | A1 * | 1/2003 | Koning et al. ............. | 714/4 |
| 2004/0268175 | A1 * | 12/2004 | Koch et al. ................ | 714/4 |
| 2005/0086342 | A1 * | 4/2005 | Burt et al. ................ | 709/224 |
| 2005/0108593 | A1 * | 5/2005 | Purushothaman et al. .... | 714/4 |
| 2005/0177766 | A1 * | 8/2005 | Lee et al. ................. | 714/11 |
| 2006/0179147 | A1 * | 8/2006 | Tran et al. ............... | 709/227 |
| 2008/0077686 | A1 * | 3/2008 | Subhraveti ............... | 709/224 |

FOREIGN PATENT DOCUMENTS

| JP | 9-036862 | 2/1997 |
|---|---|---|
| JP | 9-326810 | 12/1997 |

* cited by examiner

*Primary Examiner* — Albert T Chou
(74) *Attorney, Agent, or Firm* — Staas & Halsey LLP

(57) ABSTRACT

A connection information takeover unit in an active communication processing apparatus in the system sends connection information and a transmission sequence number of each data to be transmitted to a standby connection recovery device when a connection is established, and a connection information takeover unit in a standby communication processing apparatus retains the connection information and the latest transmission sequence number in a connection information storing unit. A dummy data sending unit of the communication processing apparatus which is switched to active because a failover occurred sends dummy data to a client, and if a transmission sequence number of a reply packet for the dummy data matches with the transmission sequence number in the connection information storing unit, a connection continuity determining unit notifies a communication processing unit that connection can be continued.

7 Claims, 18 Drawing Sheets

Fig.4A

| REQUEST IDENTIFIER (ADD) | CONNECTION IDENTIFIER | SOURCE IP ADDRESS | SOURCE PORT NUMBER | DESTINATION IP ADDRESS | DESTINATION PORT NUMBER | SEND SEQUENCE NUMBER | RECEIVE SEQUENCE NUMBER |
|---|---|---|---|---|---|---|---|

Fig.4B

| REQUEST IDENTIFIER (MOD) | CONNECTION IDENTIFIER | SEND SEQUENCE NUMBER | RECEIVE SEQUENCE NUMBER |
|---|---|---|---|

Fig.4C

| REQUEST IDENTIFIER (DEL) | CONNECTION IDENTIFIER |
|---|---|

| REQUEST IDENTIFIER (ADD) | CONNECTION IDENTIFIER | SOURCE IP ADDRESS | SOURCE PORT NUMBER | DESTINATION IP ADDRESS | DESTINATION PORT NUMBER | SEND SEQUENCE NUMBER | RECEIVE SEQUENCE NUMBER |

Fig.15A

| REQUEST IDENTIFIER (MOD) | CONNECTION IDENTIFIER | SEND SEQUENCE NUMBER | RECEIVE SEQUENCE NUMBER | COMPLETION SEQUENCE NUMBER (write_seq) |

Fig.15B

| REQUEST IDENTIFIER (DEL) | CONNECTION IDENTIFIER |

Fig.15C

CONNECTION RECOVERY DEVICE, METHOD AND COMPUTER-READABLE MEDIUM STORING THEREIN PROCESSING PROGRAM

CROSS-REFERENCE TO RELATED APPLICATION

This application is based upon and claims the benefit of priority of the prior Japanese patent applications No. 2008-185493 filed on Jul. 17, 2008 and No. 2009-068483 filed on Mar. 19, 2009, the entire contents which are incorporated herein by reference.

FIELD

A certain aspect of the embodiments disclosed herein are related to a connection recovery device, method and computer-readable medium storing a processing program for performing recovery processing of a TCP connection in a redundant system in which apparatuses having a communication processing unit are redundantly configured.

More particularly, the disclosed embodiments relate to TCP connection recovery processing in protocol control that, when a failover occurs in a redundant system, attempts to alleviate the load of recovery processing of a TCP connection at an application layer so as to increase continuous operability of a communication processing program, achieving higher reliability and performance.

BACKGROUND

When performing client-server communication using TCP/IP, the art is widely used that increases continuous operability of a server-side system by making the system redundant and performing a failover when a failure or the like occurs. For example, products that support redundant means or method, such as "Network Server IPCOM" (made by FUJITSU LIMITED), are provided.

Also, as an art for taking over a TCP connection between a server and a client when a failover occurs in a redundant server system while communication is performed between the server and the client using TCP/IP to ensure continuity of communication, "TCP CP (TCP Connection Passing)" and "TCP CP 2" are disclosed.

As a related method for automatically discovering a failure in communication between computers, processing is disclosed that monitors paths between servers in a cluster system composed of a plurality of servers and, when an anomaly is detected, dynamically switches between duplicated IP addresses to change a path.

Also, a method is disclosed that assigns a same IP address to two servers, enabling a LAN of an operating server and disabling a LAN of a standby server, and when a failure occurs in the operating server, switches the standby server to an operating server to enable the LAN thereof, and recognizes an anomaly to reestablish a connection if there is no reply (ACK) from a client side.

The following are referred to as documents which disclose arts related to the embodiments:

Patent Document 1: Japanese Patent Laid-Open No. 9-36862
Patent Document 2: Japanese Patent Laid-Open No. 9-326810

By combining the above described redundant system and the art of ensuring communication continuity of TCP CP/TCP CP2, it may be possible to take over a TCP connection and continue communication even if a failover occurs in a redundant server system while communication is performed between a client and a server using TCP/IP.

However, since a packet may be lost on a network even when takeover of a TCP connection is completed and it became possible to continue communication, connection recovery processing needs to be embedded in a communication processing program at an application layer.

That is, it is needed to embed in a communication processing program a complex recovery processing logic, such as checking sequentiality of packets and asking the other side of communication to perform resending if packet lost is detected, or disconnecting the connection and reestablishing a connection to resume communication.

As a related method of checking sequentiality of packets in a communication processing program, a method may be conceivable that provides a local rule between a client application and a server application, embeds a data length, a sequence number, etc. in a specific position of data, for example, and checks sequentiality in accordance with these information (a data length, a sequence number, etc).

However, in this case, since the communication processing program determines that a right packet is received if a value within a predetermined range is set at a specific position of the packet, a received packet is recognized as a right packet even if a wrong value is set because of packet lost or the like as long as the value set is a construable value, which could cause malfunctioning.

Also, because of characteristics of a communication processing program, a server application communicates with a plurality of client applications. Thus, separate rules adapted for characteristics of each client need to be set, making program logic of the server application complicated. In addition, a large number of man-hours are needed for tasks such as creating, testing, maintaining, etc. of a program.

Furthermore, as for performance, since check processing is performed for all packets received, communication performance deteriorates significantly.

SUMMARY

A embodiment disclosed herein is a device for a system redundantly configured with a plurality of apparatuses having a communication processing unit. The device is provided for each of the apparatuses and performing connection recovery processing when communication processing is switched between the apparatuses.

The device disclosed includes a mechanism that allows a first apparatus which is active, indicating a state in which communication processing is being performed, and a second apparatus which is standby, indicating a state in which communication processing is being waited, to occasionally transmit information of an established TCP connection and a transmission sequence number indicating sequentiality of sending and receiving data transmitted on the connection from the first apparatus which is active to the second apparatus which is standby in TCP/IP protocol control processing.

When a failover occurs in the first apparatus, the device disclosed determines, in the second apparatus which is switched from standby to active, whether or not the TCP connection can be continued in accordance with sequentiality of data packets using the information taken over from the first apparatus. If it is determined that the connection can be continued, the device notifies a communication processing unit at an application layer to resume communication on the current connection.

This enables the communication processing unit to resume communication without performing processing such as checking sequentiality of packets, alleviating processing load.

On the other hand, if it is determined that the connection cannot be continued, the device disclosed disconnects the connection. In this case, since an event of disconnecting the connection is notified to the communication processing unit, the communication processing unit performs recovery processing by, for example, reconnecting a corresponding connection only.

More specifically, the device disclosed is a connection recovery device for a system in which apparatuses having a communication processing unit are redundantly configured. The device is provided in each of the apparatuses. The device includes a connection information storing unit, a connection information takeover unit, a dummy data sending unit and a connection continuity determining unit.

In the connection recovery device provided in an apparatus which is active, the connection information takeover unit sends to the other apparatus which is standby connection information of a connection when the connection is established, and sends to the other apparatus a transmission sequence number appended to each data transmitted on the connection.

In the connection recovery device provided in the apparatus which is standby, the connection information takeover unit receives the connection information and the transmission sequence number to store in the connection information storing unit, and notifies the communication processing unit of the local apparatus that the connection is established in accordance with the connection information received. When switching to active is notified, the dummy data sending unit creates dummy data in accordance with the connection information in the connection information storing unit, and sends the dummy data to the other side of the connection. Furthermore, the connection continuity determining unit receives reply data for the dummy data sent, acquires a transmission sequence number appended to the reply data, and notifies the communication processing unit of the local apparatus that the connection can be continued if the transmission sequence number of the reply data matches with the latest transmission sequence number stored in the connection information storing unit.

Since this enables, when a failover occurs, an apparatus which newly became active in accordance with a switching notification to determine sequentiality of packet transmission and notify the communication processing unit at an application layer whether or not the connection can be continued, the load of connection recovery processing in the communication processing unit can be alleviated.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 4A, 4B and 4C are diagrams illustrating data configuration examples of takeover information in the first example;

FIG. 15A, 15B and 15C are diagrams illustrating data configuration examples of takeover information in the second example;

DETAILED DESCRIPTION OF THE PREFERRED EMBODIMENTS

Embodiments of a device disclosed will now be described using the following examples.

Figure 1:
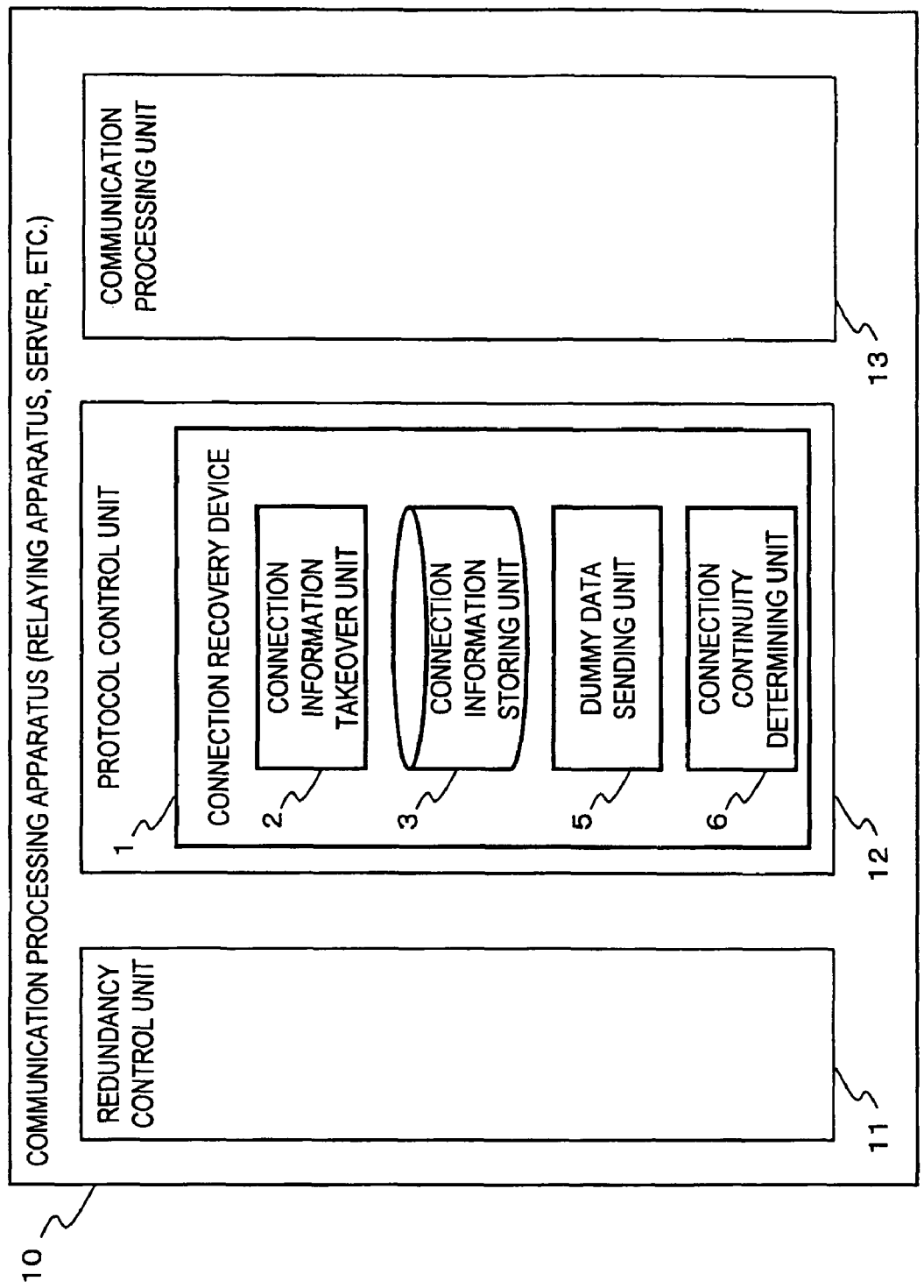
FIG. 1 is a diagram illustrating a configuration example in one embodiment of a device disclosed.

FIG. 1 is a diagram illustrating a configuration example in one embodiment of the device disclosed.

A connection recovery device 1 is provided in a communication processing apparatus 10. The communication processing apparatus 10 is a relaying apparatus, a server apparatus or the like that constitutes a redundant system that performs communication processing of the TCP/IP protocol.

The communication processing apparatus 10 includes a redundancy control unit 11, a protocol control unit 12 and a communication processing unit 13.

The redundancy control unit 11 notifies the communication processing apparatus 10 of switching between "active" which indicates a state in which an apparatus is performing communication processing and "standby" which indicates a state in which an apparatus is waiting for performing communication processing, and performs data transmission between the communication processing apparatuses 10.

The protocol control unit 12 controls the TCP protocol and the like.

The communication processing unit 13 performs a data communication service at an application layer.

A first example will be described below. The connection recovery device 1 is provided so as to cooperate with the protocol control unit 12 and includes a connection information takeover unit 2, a connection information storing unit 3, a dummy data sending unit 5 and a connection continuity determining unit 6, as illustrated in FIG. 1.

The connection information takeover unit 2 is a processing unit that performs sending and receiving connection information.

The connection information takeover unit 2 creates, if a local apparatus is active, a connection management table for connection recovery when the protocol control unit 12 establishes a connection, and sends to the connection recovery device 1 of the other communication processing apparatus 10 which is standby connection information created in accordance with contents of the connection management table as takeover information at a time of establishing a connection.

Furthermore, the connection information takeover unit 2 sends to the connection recovery device 1 of the other communication processing apparatus 10 which is standby a transmission sequence number appended to each data as takeover information at a time of detecting transmitted data whenever data transmission is performed on the connection. As a transmission sequence number, a sequence number (seq) and an acknowledgement number (ack) of a TCP header are used.

The connection information takeover unit 2 receives, if a local apparatus is standby, takeover information at a time of establishing a connection (information of a connection management table) sent from the communication processing apparatus 10 which is active via the redundancy control unit 11 to store in the connection information storing unit 3. The connection information takeover unit 2 then notifies the communication processing unit 13 of the local apparatus that a connection is established.

Also, the connection information takeover unit 2 receives takeover information at a time of detecting transmitted data (a transmission sequence number of each data), and updates a transmission sequence number for a corresponding connection stored in the connection information storing unit 3 with the latest transmission sequence number.

The connection information storing unit 3 stores information of a connection management table and the latest transmission sequence number for each connection.

The dummy data sending unit 5 creates a dummy packet whose data length is zero in accordance with connection information in the connection information storing unit 3 and sends dummy data to the other side of a connection (a client) when a failover event occurs and a notification that a local device is to be switched from standby to active is received from the redundancy control unit 11.

The connection continuity determining unit 6 receives a reply packet (ACK) for a dummy packet, and acquires a transmission sequence number (a sequence number and an acknowledgement number) appended to the reply packet. As the transmission sequence number of the reply packet, a transmission sequence number of a packet that a client processed most recently is appended. Thus, the connection continuity determining unit 6 compares the transmission sequence number obtained from the reply packet and the latest transmission sequence number stored in the connection information storing unit 3. If these two transmission sequence numbers (a sequence number of the reply packet and a receive sequence number stored, an acknowledgement number of the reply packet and a send sequence number stored) match, it is determined that packet loss did not occur on a network and the communication processing unit 13 of a local apparatus is notified that the connection can be continued.

On the other hand, if these two transmission sequence numbers do not match, the connection continuity determining unit 6 determines that packet loss occurred on a network. In accordance with this determination, the protocol control unit 12 disconnects a TCP connection. After disconnecting the TCP connection, the connection continuity determining unit 6 notifies the communication processing unit 13 of the local apparatus that the connection cannot be continued.

When notified that the connection can be continued, the communication processing unit 13 uses a socket it created to continue data transmission processing. On the other hand, when notified that the connection cannot be continued, the communication processing unit 13 releases the socket it created and reestablishes a connection.

Figure 2:
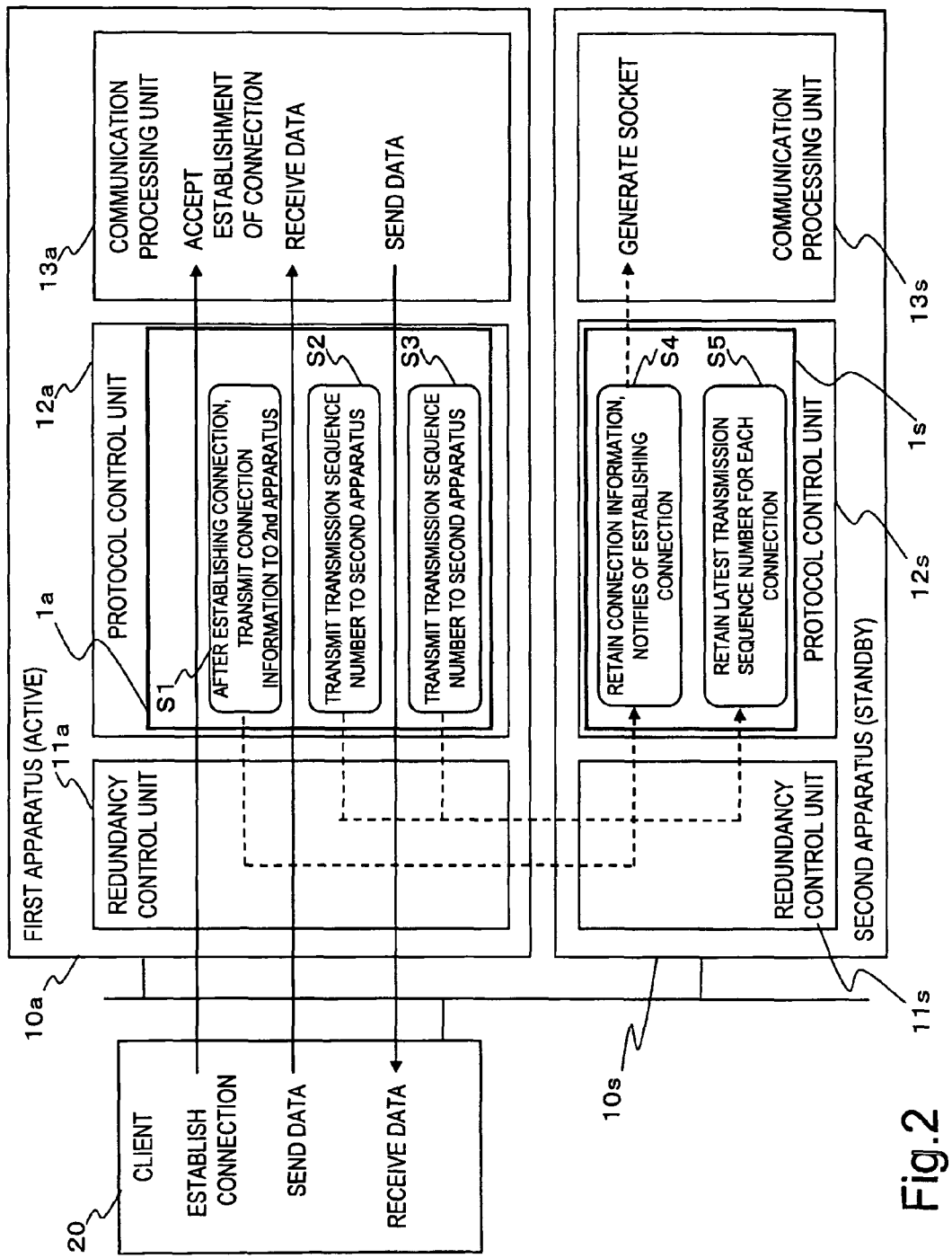
FIG. 2 is a diagram for describing connection information takeover processing before a failover occurs in a first example.

FIG. 2 is a diagram for describing connection information takeover processing before a failover occurs in the first example. In FIG. 2, it is supposed that the communication processing apparatus 10 which is active in a redundant system is a first apparatus 10a and the communication processing apparatus 10 which is standby is a second apparatus 10s.

Step S1: When a TCP connection is established between a communication processing unit 13a of the first apparatus 10a and a client 20, a connection information takeover unit 2a of a connection recovery device 1a stores a connection management table created by a protocol control unit 12a in a connection information storing unit 3a.

Figure 3:
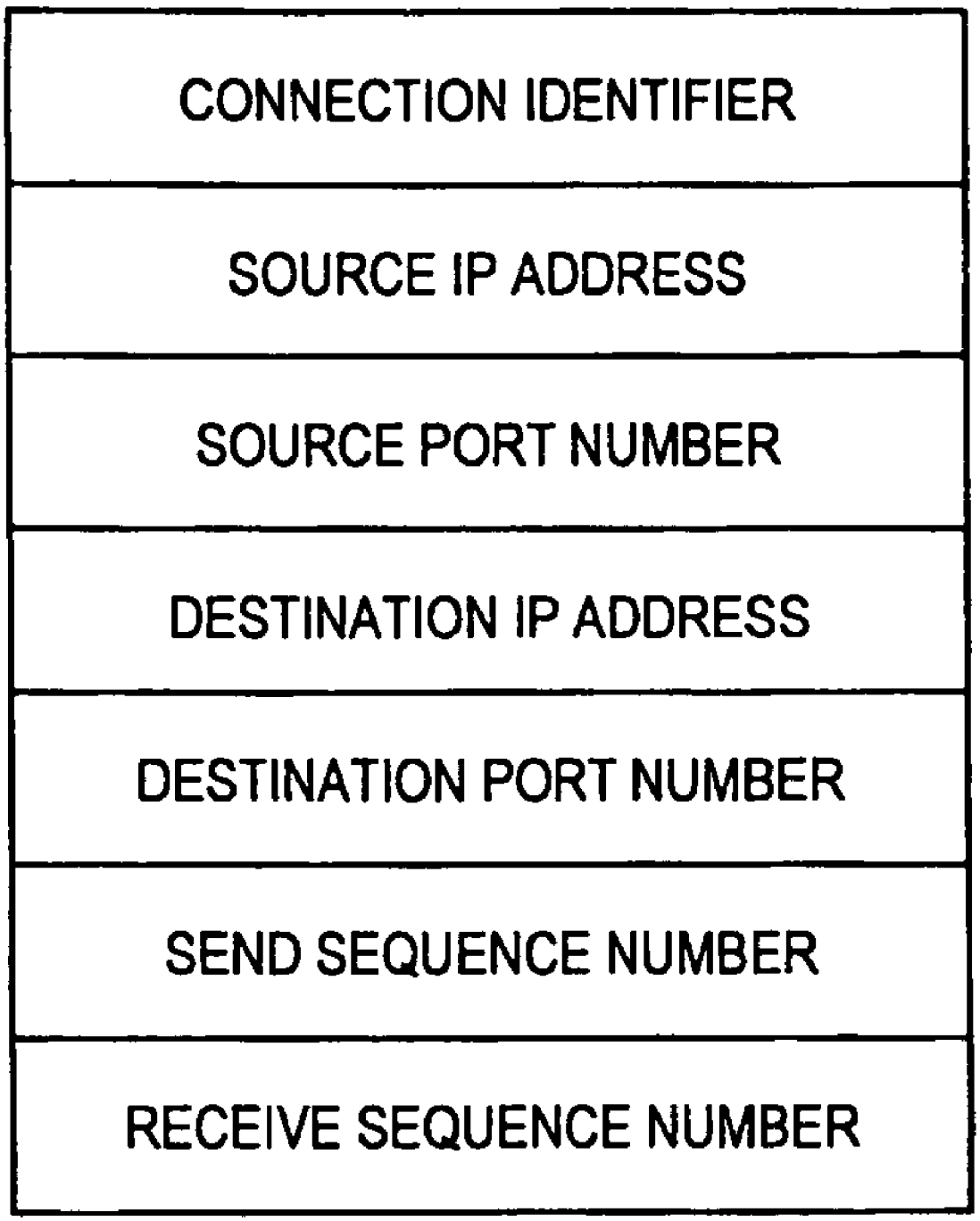
FIG. 3 is a diagram illustrating a data configuration example of a connection management table in the first example.

FIG. 3 illustrates a data configuration example of a connection management table in the first example.

The connection management table stores a connection identifier that identifies a connection, a source IP address, a source port number, a destination IP address, a destination port number, a send sequence number of a sent packet, and a receive sequence number of a received reply packet.

Furthermore, the connection information takeover unit 2a uses an inter-apparatus data transmission mechanism provided by a redundancy control unit 11a to send to the second apparatus 10s connection information, which is contents of the connection management table, as "takeover information at a time of establishing a connection".

Steps S2 and S3: Whenever data transmission is detected between the client 20 and the communication processing unit 13a, the connection information takeover unit 2a of the connection recovery device 1a acquires a transmission sequence number of each data, and sends to the second apparatus 10s the acquired transmission sequence number as "takeover information at a time of detecting data".

Step S4: A connection information takeover unit 2s of a connection recovery device 1s in the second apparatus 10s receives the takeover information at a time of establishing a connection (the connection management table) from the first apparatus 10a to store in a connection information storing unit 3s. Furthermore, the connection information takeover unit 2s notifies a communication processing unit 13s that a TCP connection is established.

When notified of establishing the TCP connection, the communication processing unit 13s creates a socket which will be a source endpoint for TCP/IP communication in accordance with connection information to prepare for taking over the TCP connection.

Step S5: The connection information takeover unit 2s receives takeover information at a time of detecting data occasionally notified from the first apparatus 10a, and updates a transmission sequence number for a corresponding connection in a connection management table in the connection information storing unit 3s.

Although not illustrated in FIG. 2, when the protocol control unit 12a of the first apparatus 10a releases a connection, the connection information takeover unit 2a notifies the connection recovery device is of "takeover information at a time of releasing a connection (a connection identifier of a released connection)".

The connection information takeover unit 2s receives the takeover information at a time of releasing a connection, and deletes corresponding connection information stored in the connection information storing unit 3s. Furthermore, the connection information takeover unit 2s notifies the communication processing unit 13s that the TCP connection is released.

FIG. 4 is a diagram illustrating data configuration examples of takeover information in the first example.

FIG. 4A is a data configuration example of takeover information at a time of establishing a connection. The takeover information at a time of establishing a connection includes a request identifier that identifies a type of information (ADD: a write request of connection information), a connection identifier, a source IP address, a source port number, a destination IP address, a destination port number, a send sequence number and a receive sequence number.

FIG. 4B is a data configuration example of takeover information at a time of detecting transmitted data. The takeover information at a time of detecting transmitted data includes a request identifier (MOD: an update request of connection information), a connection identifier, a send sequence number and a receive sequence number.

FIG. 4C is a data configuration example of takeover information at a time of releasing a connection. The takeover information at a time of releasing a connection includes a request identifier (DEL: a delete request of connection information) and a connection identifier.

Figure 5:
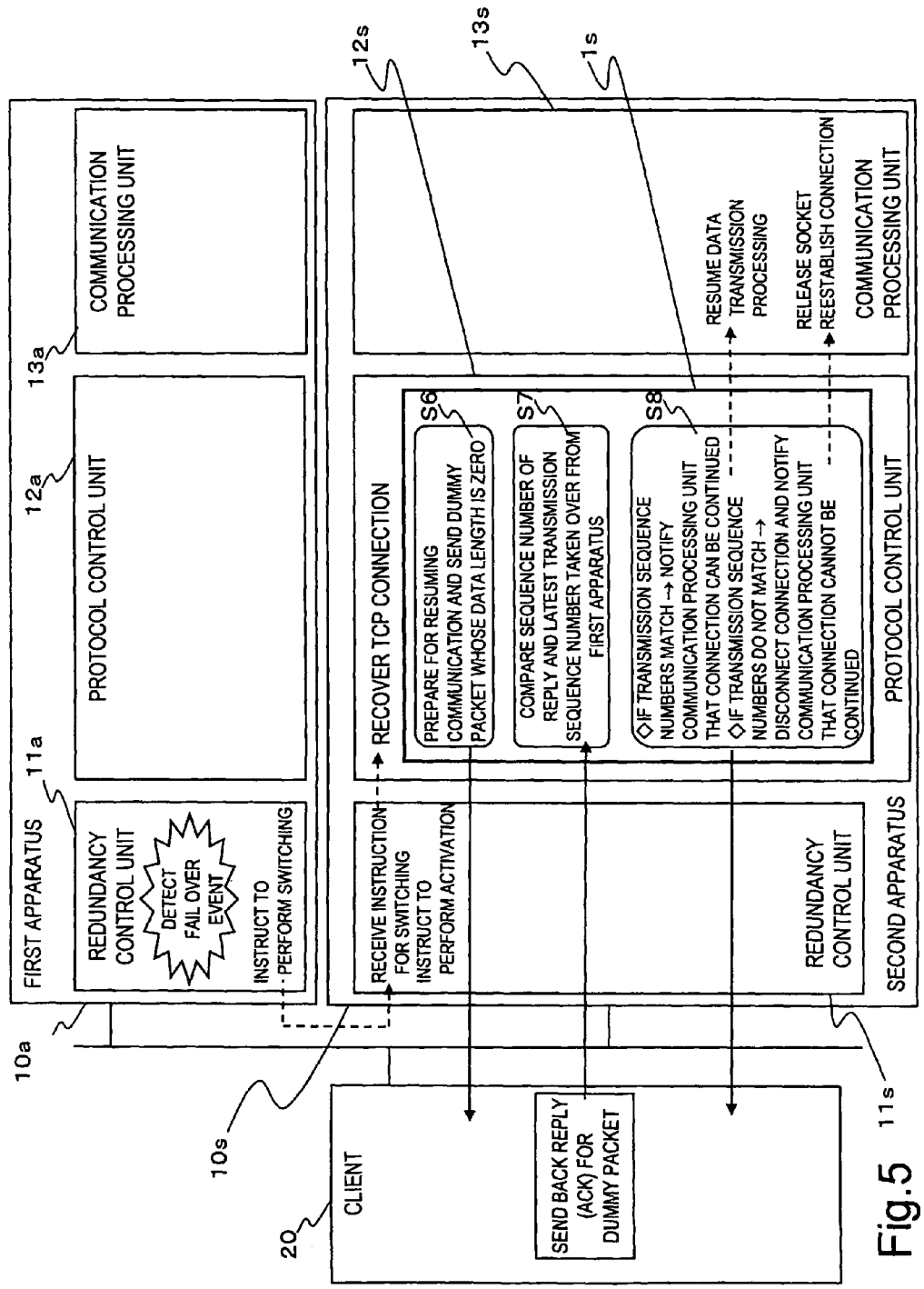
FIG. 5 is a diagram for describing connection recovery processing when a failover occurs in the first example.

FIG. 5 is a diagram for describing connection recovery processing when a failover occurs in the first example.

When a failover event is detected in the first apparatus 10a, the redundancy control unit 11a of the first apparatus 10a sends a switch notification. On receiving the switch notification, a redundancy control unit 11s of the second apparatus 10s activates the second apparatus 10s.

When the redundancy control unit 11s notifies a protocol control unit 12s of switching to active, the connection recovery device 1s starts recovery processing of a TCP connection to deploy TCP connection information on an OS (kernels) and establish a pseudo TCP connection with the client 20. The following processes are then performed.

Figure 6:
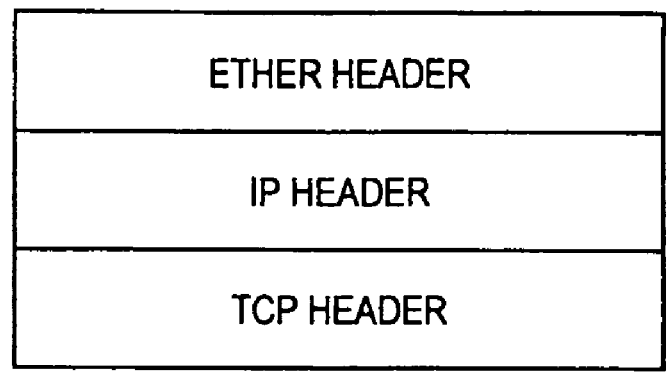
FIG. 6 is a diagram illustrating an example of a dummy packet in the first example.

Step S6: A dummy data sending unit 5s of the connection recovery device 1s creates a dummy packet having headers only (data length=0), as illustrated in FIG. 6, to send to the client 20.

Step S7: On receiving the dummy packet, the client 20 sends back a reply (ACK) packet for the dummy packet.

Figure 7:
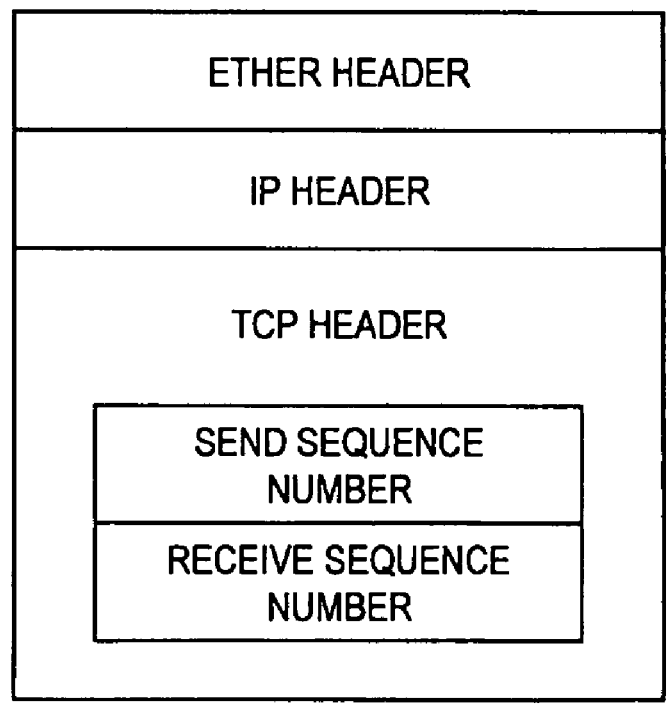
FIG. 7 is a diagram illustrating an example of a reply packet in the first example.

FIG. 7 illustrates a data configuration example of a reply packet in the first example. Appended to a TCP header of a reply packet illustrated in FIG. 7 is a transmission sequence number (a sequence number and an acknowledgement number) of a packet that the client 20 processed most recently.

A connection continuity determining unit 6s compares a transmission sequence number appended to the reply packet and the latest transmission sequence number stored in the connection information storing unit 3s.

Step S8: If the two transmission sequence numbers match, the connection continuity determining unit 6s determines that packet loss did not occur on a network and notifies the communication processing unit 13s that the connection can be continued.

On the other hand, if the two transmission sequence numbers do not match, the connection continuity determining unit 6s determines that packet loss occurred on a network. The protocol control unit 12s then disconnects the TCP connection. After the connection is disconnected, the connection continuity determining unit 6s notifies the communication processing unit 13s that the connection cannot be continued.

If notified that the connection can be continued, the communication processing unit 13s performs data transmission processing using a socket it prepared, and if notified that the connection cannot be continued, the communication processing unit 13s releases the socket and performs connection establishing processing again.

Figure 8:
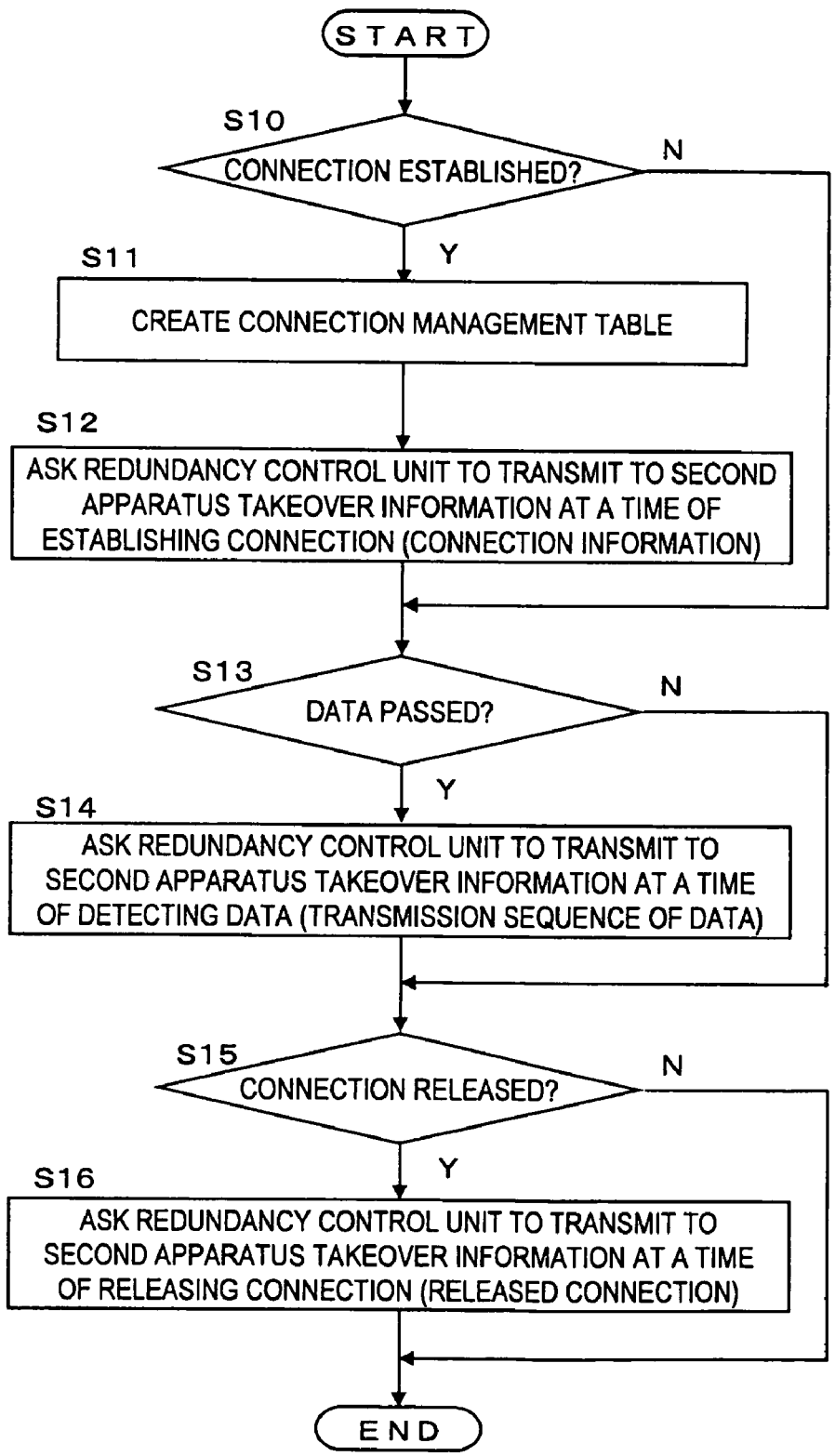
FIG. 8 is a processing flow of takeover processing of connection information on an active side in the first example.
Figure 9:
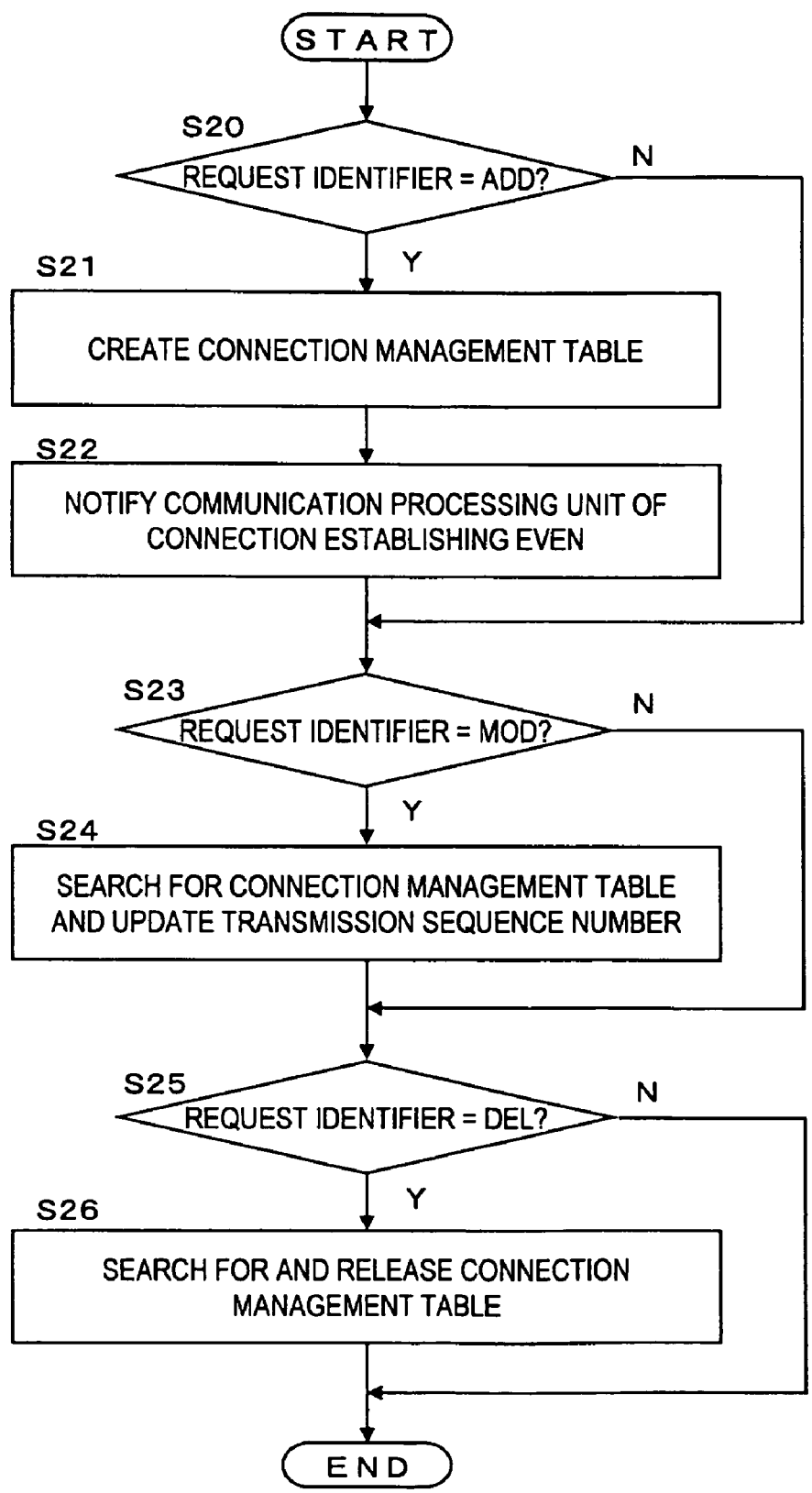
FIG. 9 is a processing flow of takeover processing of connection information on a standby side in the first example.
Figure 10:
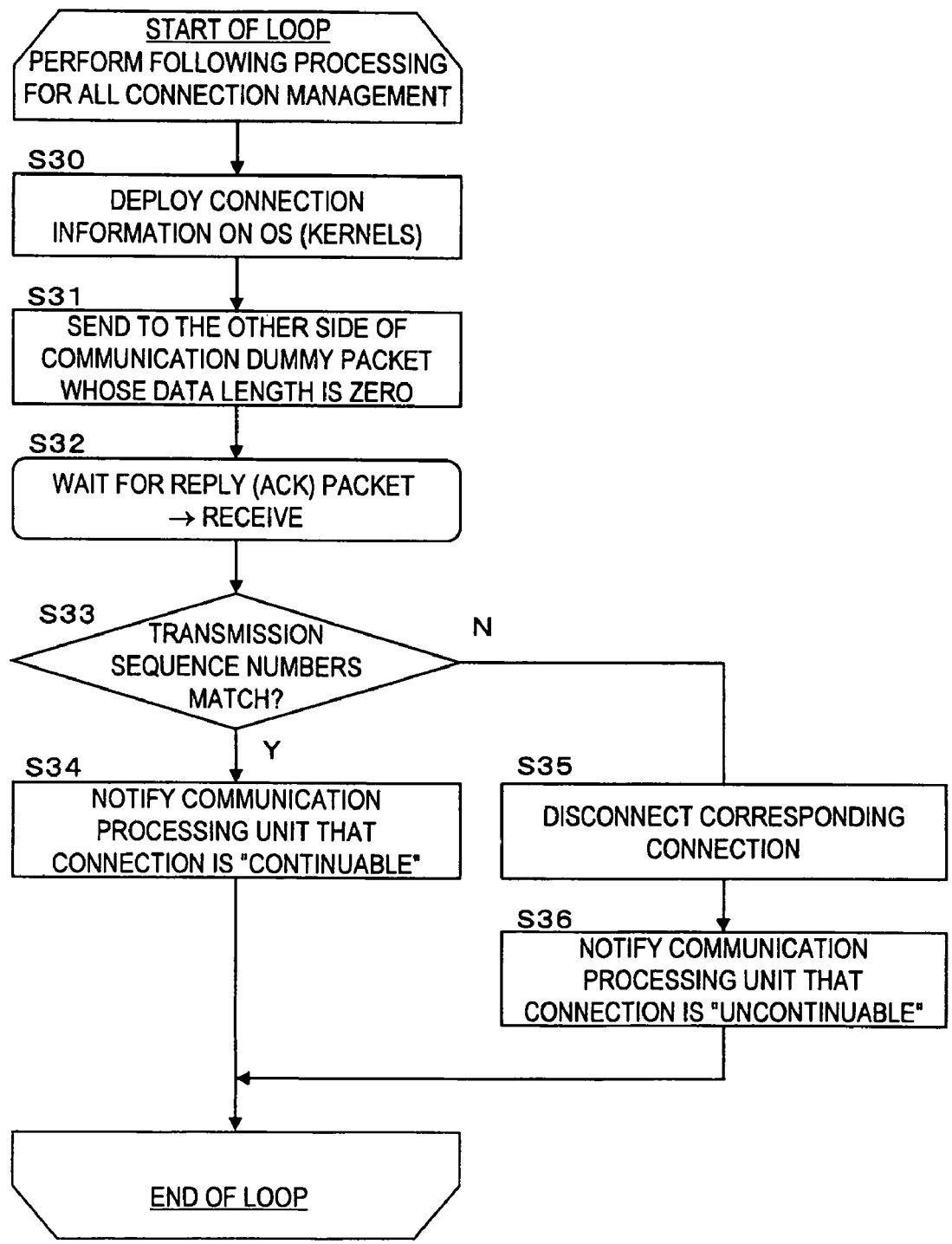
FIG. 10 is a processing flow of connection recovery processing in the first example.

FIGS. 8 to 10 are processing flow charts of the connection recovery device 1 in the first example.

FIG. 8 is a processing flow of takeover processing of connection information on an active side.

In the first apparatus 10a, the connection information takeover unit 2a of the connection recovery device 1a checks whether the protocol control unit 12a has established a connection (step S10), and only if it is detected that a connection has established (Y on the step S10), creates a connection management table illustrated in FIG. 3 (step S11). The connection information takeover unit 2a generates takeover information at a time of establishing a connection (a request identifier=ADD; data of a connection table) illustrated in FIG. 4A, and asks the redundancy control unit 11a to transmit the takeover information at a time of establishing a connection to the connection recovery device is in the second apparatus 10s. The connection management table is taken over to the connection recovery device is via the redundancy control units 11a and 11s (step S12).

The connection information takeover unit 2a checks whether data has been passed through the protocol control unit 12a (step S13), and only if passing of data is detected (Y on the step S13), generates takeover information at a time of detecting data (a request identifier=MOD; a connection identifier of data that has passed through; a transmission sequence number of that data) illustrated in FIG. 4B and asks the redundancy control unit 11a to transmit the takeover information at a time of detecting data to the connection recovery device 1s (step S14).

Also, the connection information takeover unit 2a checks whether a connection has been released in the protocol control unit 12a (step S15), and only if release of a connection is detected (Y on the step S15), generates takeover information at a time of releasing a connection (a request identifier=DEL; a connection identifier of a released connection) illustrated in FIG. 4C and asks the redundancy control unit 11a to transmit the takeover information at a time of releasing a connection to the connection recovery device 1s (step S16).

FIG. 9 illustrates a processing flow of takeover processing of connection information on a standby side.

In the second apparatus 10s, the connection information takeover unit 2s of the connection recovery device 1s checks a request identifier of takeover information received via the redundancy control unit 11s (step S20), and if the request identifier is ADD (Y on the step S20), creates a connection management table in accordance with the takeover information received to store in the connection information storing unit 3s (step S21). Furthermore, the connection information takeover unit 2s notifies the communication processing unit 13s of an event of establishing a connection (step S22).

Also, the connection information takeover unit 2s checks the request identifier of the takeover information received via the redundancy control unit 11s (step S23), and if the request identifier is MOD (Y on the step S23), searches for a connection management table of a corresponding connection and updates a transmission sequence number in accordance with received connection information (step S24).

Also, the connection information takeover unit 2s checks the request identifier of the takeover information received via the redundancy control unit 11s (step S25), and if the request identifier is DEL (Y on the step S25), searches for and releases a connection management table of a corresponding connection (step S26).

FIG. 10 is a processing flow of connection recovery processing.

Upon being notified of switching to active, the connection recovery device 1s performs processing of steps S30 to S36 for all connection management tables stored in the connection information storing unit 3s.

The protocol control unit 12s deploys connection information (a connection management table) on an OS (kernels) (step S30). The dummy data sending unit 5s sends to the client 20, which is the other side of the communication, a dummy packet whose data length is zero (step S31). The connection recovery device 1s waits for and receives a reply (ACK) packet from the client 20 (step S32).

The connection continuity determining unit 6s checks whether a transmission sequence number of the reply packet and a transmission sequence number in a connection management table match (step S33), and if the transmission sequence numbers match (Y on the step S33), notifies the communication processing unit 13s that the connection is "continuable" (step S34).

On the other hand, if it is determined that the transmission sequence numbers do not match (N on the step S33), the protocol control unit 12s disconnects a corresponding connection (step S35). The connection continuity determining unit 6s notifies the communication processing unit 13s that the connection is "uncontinuable" (step S36).

A second example will be described below. Since there is a timing in the processing of the first example at which packet drop out may occur because of a failover during data transmission, it is adapted in a second example such that packet drop out is actively detected at that timing to disconnect a connection.

In the processing of the first example, if packet drop out occurs when a connection is being used, that is, a data transmission request is being performed (transmitted), a state of data transmission may be falsely recognized when recovering a connection.

In the second example, it is determined whether the redundancy control unit 11a is using a connection (processing data transmission) in the connection recovery device 1a of the first apparatus 10a which is active. Then, in order to allow disconnecting the connection if the connection is being used, the connection recovery device 1s of the second apparatus 10s which is standby is adapted to recognize a transmission sequence number of the latest state when transmitting data. This enables to achieve higher reliability.

Although configurations of the connection recovery devices (1a and 1s) in the second example are the same as those in the first example, processing described below is further performed.

(1) Processing to respond to packet drop out while receiving data

Figure 11:
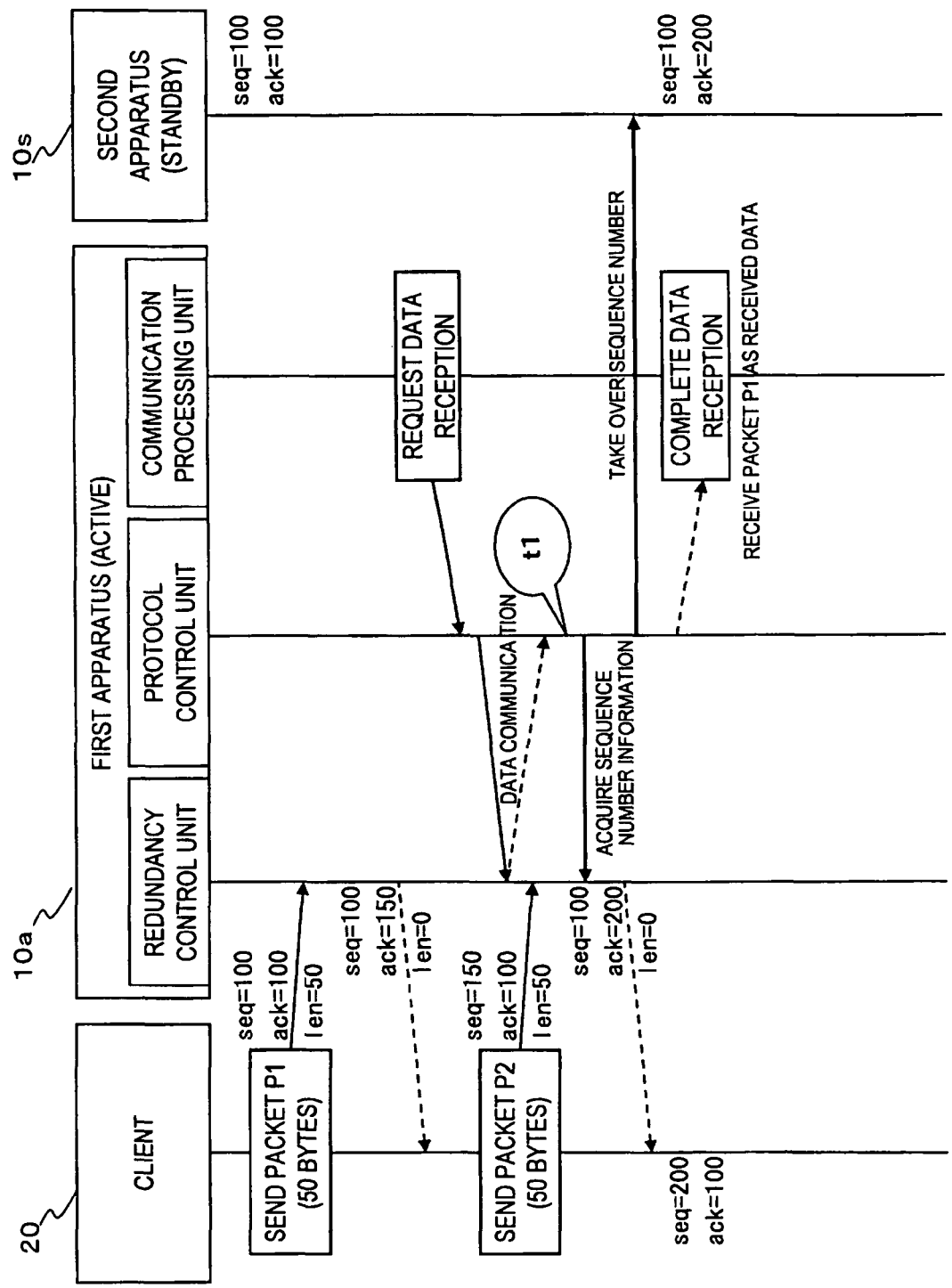
FIG. 11 is a diagram for describing a timing at which packet drop out occurs while receiving data.

FIG. 11 is a diagram for describing a timing at which packet drop out occurs while receiving data.

In the first example, when the connection recovery device 1a of the first apparatus 10a detects data reception at the protocol control unit 12a, the protocol control unit 12a acquires a transmission sequence number (a sequence number and an acknowledgement number) at a time of receiving data at a timing (t1) immediately following data reception from the redundancy control unit 11a, and sends to the second apparatus 10s the acquired information as "takeover information at a time of detecting data". For example, in the first apparatus 10a, when the redundancy control unit 11a starts receiving data (a packet p1, a packet p2, . . . ) from the client 20, the protocol control unit 12a detects a data reception request from the communication processing unit 13a, and acquires a transmission sequence number (a sequence number (seq) and an acknowledging number (ack)) of received data from the redundancy control unit 11a. The connection information takeover unit 2a of the connection recovery device 1a generates "takeover information at a time of detecting data" in accordance with information acquired by the protocol control unit 12a to send to the communication processing apparatus 10s which is standby.

At a timing at which the protocol control unit 12a acquires a transmission sequence number, if the redundancy control unit 11a has already started receiving the next packet P2, a transmission sequence number the redundancy control unit 11a retains has been updated to the transmission sequence number of the received packet P2. Thus, the connection information takeover unit 2a acquires the transmission sequence number of the packet p2 (seq=100, ack=200) instead of the transmission sequence number of the packet p1 (seq=100, ack=150) via the protocol control unit 12a.

Since an acknowledgement number (ack) of the acquired transmission sequence number has been updated to the one for the packet p2 which the communication processing unit 13a has not received yet, if takeover information generated in accordance with that information is sent to the second apparatus 10s which is standby, the second apparatus 10s falsely recognizes that the first apparatus 10a has received the packet P2 which actually has not received yet.

In order to prevent such false recognition, when data transmission is detected at the protocol control unit 12a and that data transmission is data reception by the first apparatus 10a, the connection information takeover unit 2a checks an existing receive buffer included in the redundancy control unit 11a which is an area where received data to be transmitted to the communication processing unit 13a is temporally retained. If data does not exist in the receive buffer, the connection information takeover unit 2a determines that a connection is not being used, acquires a transmission sequence number appended to data of the data transmission (reception), and generates takeover information at a time of transmitting data in accordance with the acquired information to send to the second apparatus 10s.

Specifically, when data transmission at the protocol control unit 12a is detected and that data transmission is data reception, the connection information takeover unit 2a checks whether data is left in a receive buffer of the redundancy control unit 11a from connection information which the protocol control unit 12a acquired from the redundancy control unit 11a just after the data reception is completed.

Determination of whether data is left in a receive buffer of the redundancy control unit 11a is performed by referring to flag information indicating that a receive buffer is generated in the redundancy control unit 11a, a receive buffer length in connection information, etc.

Only if data does not exist in a receive buffer of the redundancy control unit 11a, the connection information takeover unit 2a rewrites a connection management table in the connection information storing unit 3a in accordance with a transmission sequence number of received data, and generates takeover information at a time of detecting data to send to the second apparatus which is standby.

Figure 12:
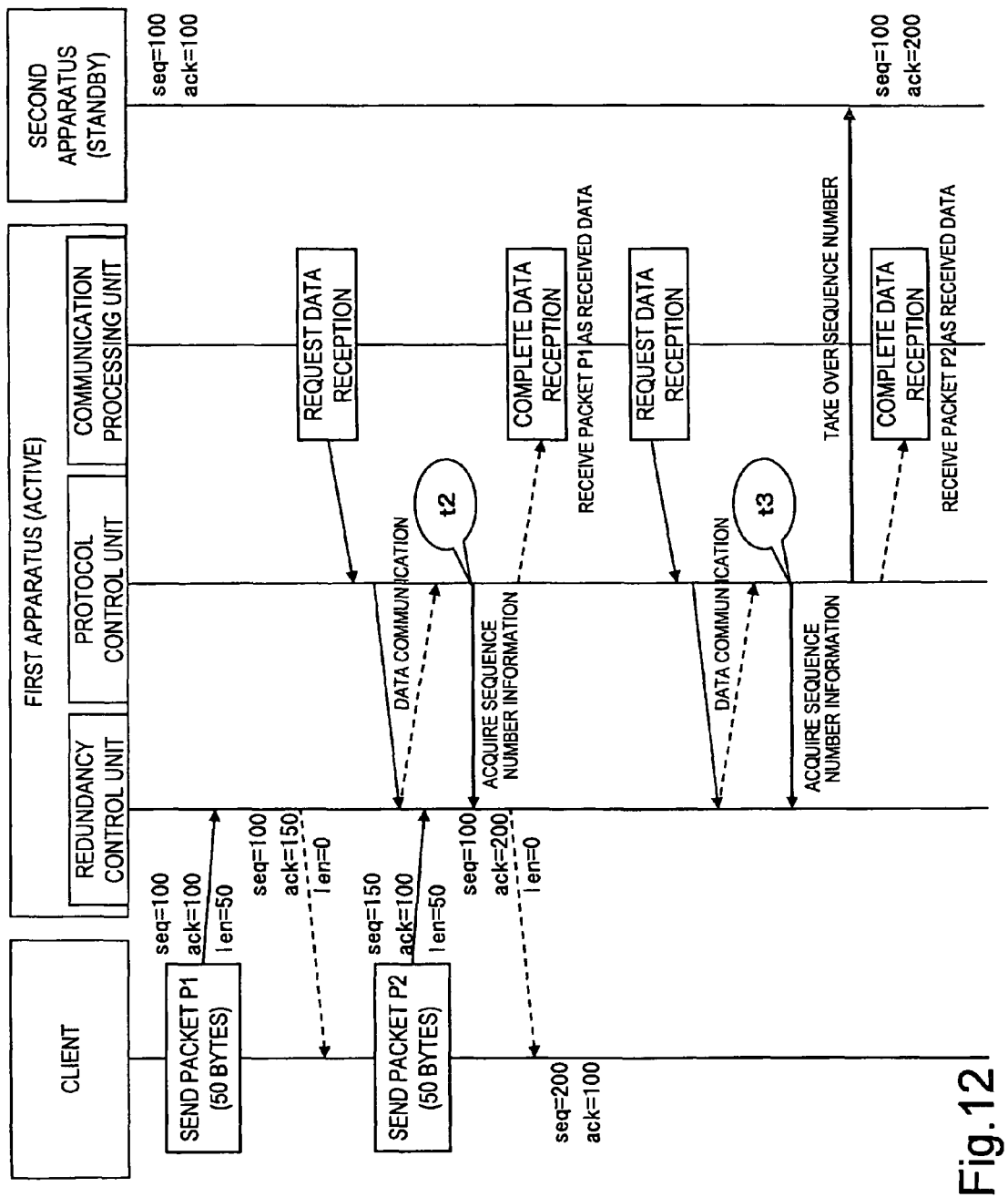
FIG. 12 is a diagram for describing processing timings while receiving data in a connection recovery device 1a on an active side in a second example.

FIG. 12 is a diagram for describing processing timings while receiving data in the connection recovery device 1a of the first apparatus 10a which is active in the second example.

Upon detecting a data reception request from the communication processing unit 13a, the protocol control unit 12a of the first apparatus 10a which is active receives a packet p1 (50 bytes) from the redundancy control unit 11a. Also, just after receiving the packet p1, the protocol control unit 12a acquires connection information for reception of the packet p1 from the redundancy control unit 11a (t2).

The connection information takeover unit 2a of the connection recovery device 1a determines whether data exists in a receive buffer of the redundancy control unit 11a from a receive buffer length in the connection information that the protocol control unit 12a acquired from the redundancy control unit 11a. If the redundancy control unit 11a is receiving a next packet p2 (50 bytes), the receive buffer length in the acquired connection information is a value other than "0". Also, an acknowledgement number (ack) included in the connection information is updated to the one for the packet p2 (ack=200).

If it is determined that data exists in a receive buffer of the redundancy control unit 11a, the connection information takeover unit 2a does not generate takeover information at a time of detecting data.

Suppose that the redundancy control unit 11a is receiving the packet p2 (50 bytes) subsequent to the packet p1.

Upon detecting a data reception request from the communication processing unit 13a, the protocol control unit 12a receives the packet p2 (50 bytes) that the redundancy control unit 11a received. Just after this data reception is completed, the protocol control unit 12a acquires connection information from the redundancy control unit 11a (t3). At this point, if the redundancy control unit 11a has not received data since receiving the packet p2, a data length of a receive buffer of the redundancy control unit 11a is "0".

If it is determined that data does not exist in a receive buffer of the redundancy control unit 11a, the connection information takeover unit 2a generates takeover information at a time of detecting data in accordance with a transmission sequence number of received data that the protocol control unit 12a obtained from the redundancy control unit 11a to send to the connection recovery device 1s of the second apparatus 10s.

(2) Processing to respond to a packet inconsistency while sending data

Figure 13:
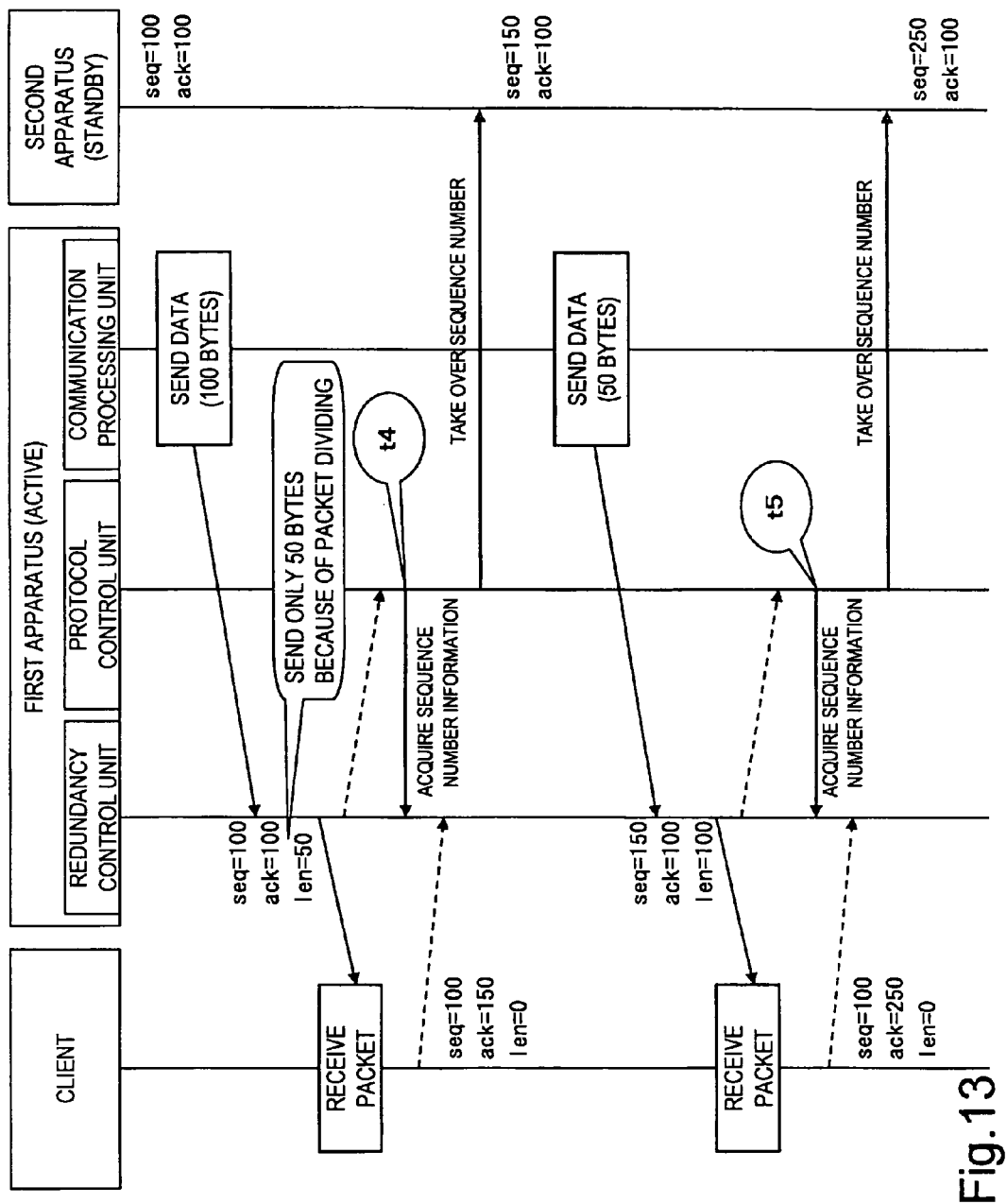
FIG. 13 is a diagram for describing a timing at which an inconsistency of sequence numbers of data sending occurs while sending data.

FIG. 13 is a diagram for describing timings at which an inconsistency of sequence numbers of data sending occurs while sending data.

In the first example, upon detecting a data sending request from the communication processing unit 13a, the protocol control unit 12a of the connection recovery device 1a acquires a transmission sequence number of data sending from the redundancy control unit 11a at timings (t4 and t5) just after data sending is completed at the redundancy control unit 11a, and sends takeover information at a time of detecting data (sending data) to the second apparatus 10s.

However, data that the communication processing unit 13a requested to send (100 bytes) may be divided at a TCP layer of the redundancy control unit 11a, resulting in being sent in a form of a plurality of packets (50 bytes). In this case, sending of some of the divided packets may be delayed.

If the protocol control unit 12a acquires a transmission sequence number at a timing at which some packets have been sent before the redundancy control unit 11a has sent all data requested to be sent (t4), a sequence number (seq) of a transmission sequence number acquired by the protocol control unit 12a is only updated for packets that have been sent.

If the connection information takeover unit 2a generates takeover information at a time of detecting (sending) data in accordance with such information to send to the second apparatus 10s which is standby, the second apparatus 10s which is standby takes over a sequence number (seq) of data that have been partly sent.

If a failover occurs in such situation and communication processing is taken over, a transmission sequence number of a reply packet from the client 20 matches with a transmission sequence number of takeover information retained by the connection recovery device 1s of the second apparatus 10s which is standby. As a result, the connection recovery device 1s determines that data sending has been completed successfully and the connection can be continued even though only a part of data requested to be sent has been actually sent and data loss has occurred.

By not sending takeover information from the connection recovery device 1a to the second apparatus 10s which is standby when data exists in a send buffer of the redundancy control unit 11a of the first apparatus 10a which is active, it is possible to prevent takeover information from being sent in a half-completed situation. However, unlike when receiving data, since data is not resent from the communication processing unit 13a when sending data, a mechanism for sending takeover information to the second apparatus 10s after all data has been sent, such as resending processing controlled by a timer, is needed.

Thus, in the second example, by adding and notifying of, on a data sending side, a sequence number which is not half-completed, that is, a sequence number of when data sending is completed, it is avoided to determine that a connection can be continued in accordance with takeover information of a half-completed sending state.

Thus, when data transmission is detected in the protocol control unit 12a and that data transmission is data sending from the communication processing unit 13a of the first apparatus 10a, the connection information takeover unit 2a of the connection recovery device 1a provides a completion sequence number (write_seq) updated for all data that is scheduled to be sent as information indicating a sequence number of a state in which the data transmission is completed. The connection information takeover unit 2a then generates takeover information at a time of transmitting data that includes a transmission sequence number appended to sent data while transmitting data and the completion sequence number to send to the connection recovery device 1s of the second apparatus 10s.

Also, if an acknowledgement number of a transmission sequence number appended to a reply packet for the dummy packet matches with a completion sequence number stored in the connection information storing unit, the connection continuity determining unit 6s notifies the communication processing unit 13s that the connection is "continuable".

In the second example, a completion sequence number (write_seq) is acquired and recorded for all data to be sent by the redundancy control unit 11a. The protocol control unit 12a acquires connection information including a completion sequence number from the redundancy control unit 11a.

In accordance with the connection information that the protocol control unit 12a acquired from the redundancy control unit 11a, the connection information takeover unit 2a of the connection recovery device 1a records a transmission sequence number and a completion sequence number of sent data in a connection management table in the connection information storing unit 3a. Furthermore, the connection information takeover unit 2a generates "takeover information at a time of detecting data" in accordance with the connection management table to send to the connection recovery device 1s of the second apparatus 10s.

Figure 14:
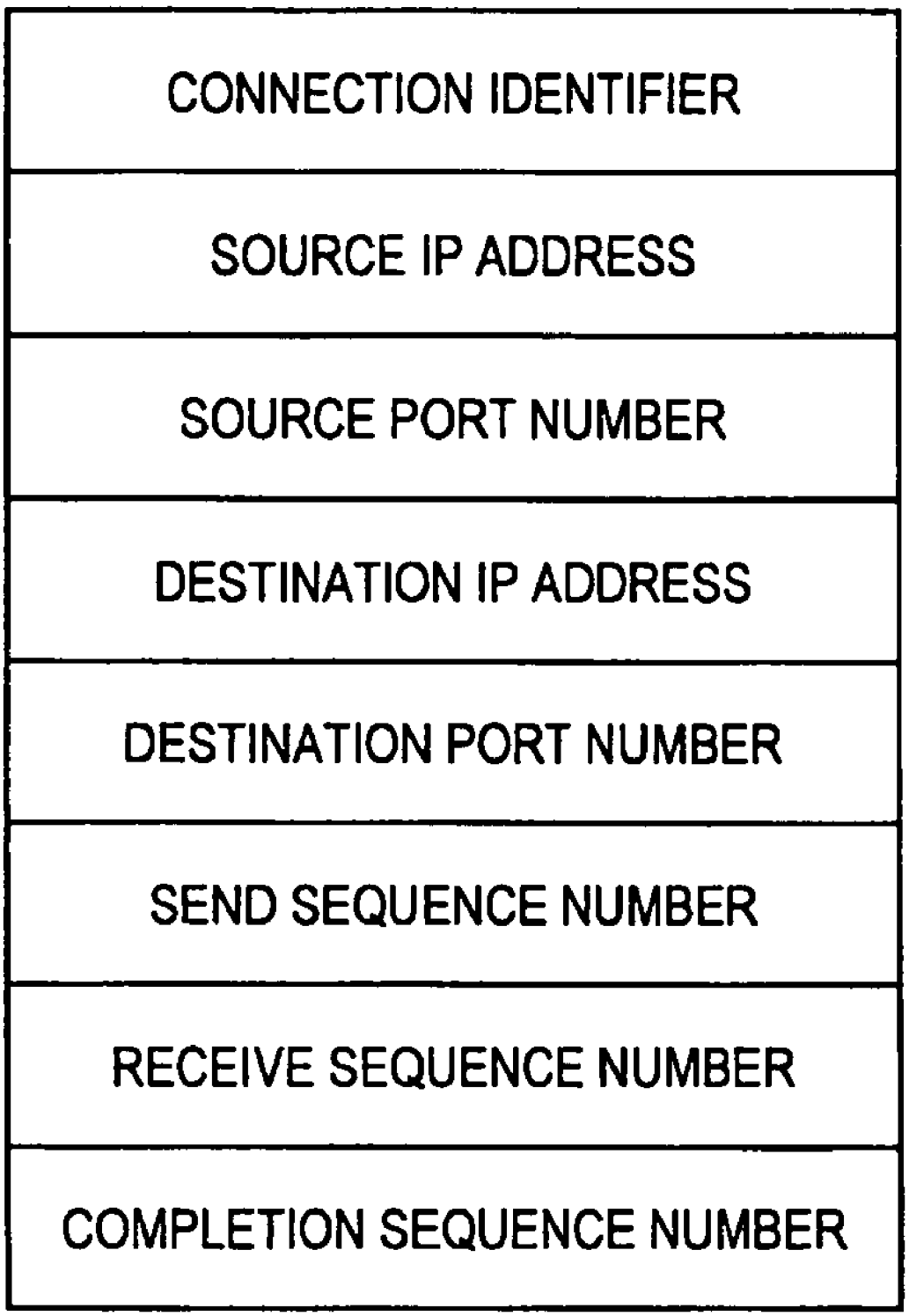
FIG. 14 is a diagram illustrating a data configuration example of a connection management table in the second example.

FIG. 14 illustrates a data configuration example of a connection management table in the second example. The connection management table in the second example is similar to a connection management table illustrated in FIG. 3 except that an item for a completion sequence number (write_seq) is added.

FIG. 15 is a diagram illustrating data configuration examples of takeover information in the second example. FIGS. 15A, 15B and 15C illustrate a data configuration example of takeover information at a time of establishing a connection, a data configuration example of takeover information at a time of detecting data, and a data configuration example of takeover information at a time of releasing a connection, respectively.

Takeover information in FIGS. 15A and 15C has the same data configuration as takeover information in the first example illustrated in FIGS. 4A and 4C.

Takeover information at a time of detecting data in FIG. 15B includes data items of takeover information illustrated in FIG. 4B plus an item for a completion sequence number (write_seq). A completion sequence number (write_seq) in takeover information is set in accordance with a connection management table illustrated in FIG. 14.

This enables to determine whether all data that should be sent is sent to the client 20 by comparing a completion sequence number (write_seq) in takeover information and an acknowledgement number (ack) of the client 20 when the second apparatus 10s which is standby is switched to active.

Figure 16:
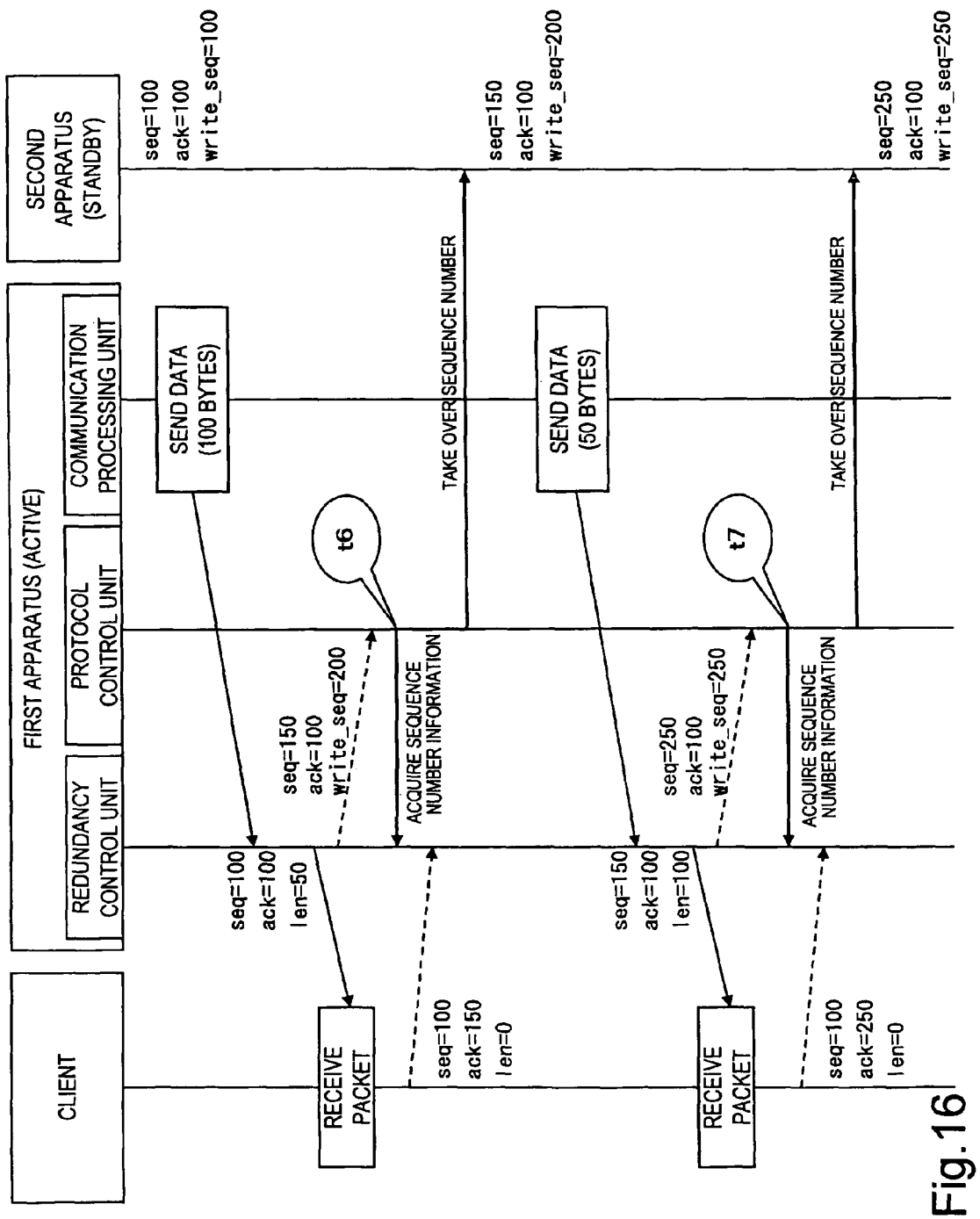
FIG. 16 is a diagram for describing processing timings while sending data in the connection recovery device 1a on an active side in the second example.

FIG. 16 is a diagram for describing processing timings while sending data in the connection recovery device 1a of the first apparatus 10a which is active in the second example.

The protocol control unit 12a of the first apparatus 10a which is active detects a send request of data (100 bytes) from the communication processing unit 13a. The redundancy control unit 11a divides the data that is requested to be sent, sends two packets p5 and p6 (50 bytes each), and records a completion sequence number which is updated for data that is scheduled to be sent.

Immediately after the redundancy control unit 11a has sent the packet p5 (t6), the protocol control unit 12a acquires from the redundancy control unit 11a a transmission sequence number (a sequence number seq=100, an acknowledgement number_ack=150) of sending the packet p5 and a completion sequence number (write_seq=200).

The connection information takeover unit 2a of the connection recovery device 1a stores the transmission sequence number and the completion sequence number acquired by the protocol control unit 12a in a connection management table in the connection information storing unit 3a, and further generates takeover information at a time of detecting data (sending data) to send to the connection recovery device 1s of the second apparatus 10s which is standby.

In the second apparatus 10s which is switched to active, if a failover occurs when the next packet p6 is being sent, the connection continuity determining unit 6s of the connection recovery device 1s can compare an acknowledgement number (ack=150) of a reply packet from the client 20 for a dummy packet sent by the dummy data sending unit 5s and the completion sequence number (write_seq=200), and recognize that only the first packet (50 bytes) of data that was requested to be sent has been actually sent. Thus, the second apparatus 10s can recognize that data loss occurred.

Even when the communication processing unit 13a of the first apparatus which is active requests to send data (50 bytes) and the redundancy control unit 11a sends the data (a packet p7) without modification, a value updated for data to be sent is stored in a completion sequence number (write_seq). The connection information takeover unit 2a then acquires, immediately after the redundancy control unit 11a has sent the packet p7 (t7), a transmission sequence number (a sequence number seq=250, an acknowledgement number ack=100) of sending the packet p7 and a completion sequence number (write_seq=250) from the redundancy control unit 11a.

The connection information takeover unit 2a of the connection recovery device 1a generates takeover information as with the case described above to send to the second apparatus 10s. The connection recovery device 1s can recognize that all data that was requested to be sent has been sent because the acknowledgement number (ack=250) of the reply packet matches with the completion sequence number (write_seq=250).

Even in the above described (1) processing to respond to packet drop out while receiving data, the redundancy control unit 11a records a completion sequence number (write_seq), and the connection recovery device 1a hands over the completion sequence number (write_seq) to the connection recovery device 1s of the second apparatus 10s which is standby with a connection management table in FIG. 14 and takeover information in FIG. 15.

Figure 17:
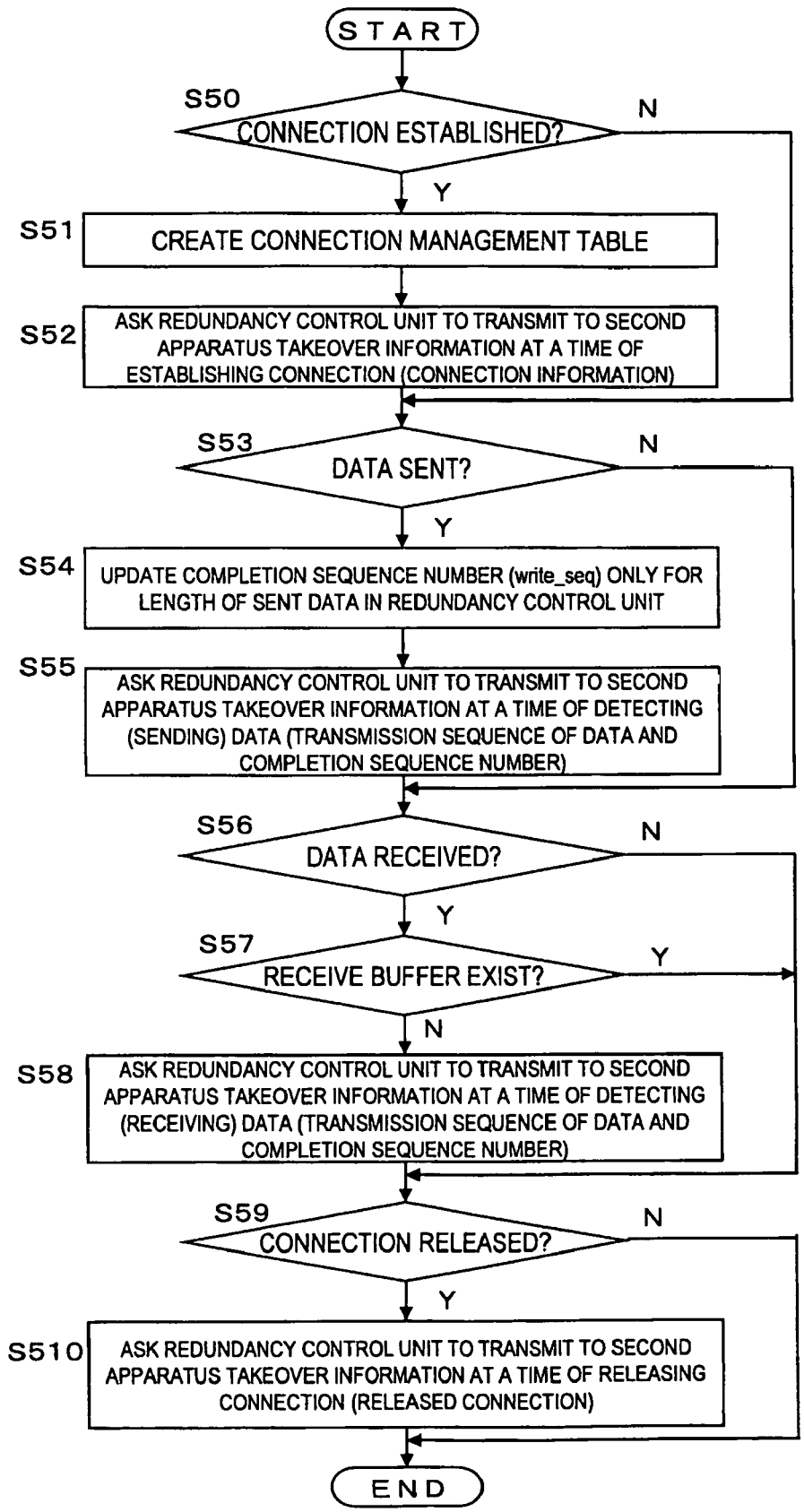
FIG. 17 is a processing flow of takeover processing of connection information on an active side in the second example.
Figure 18:
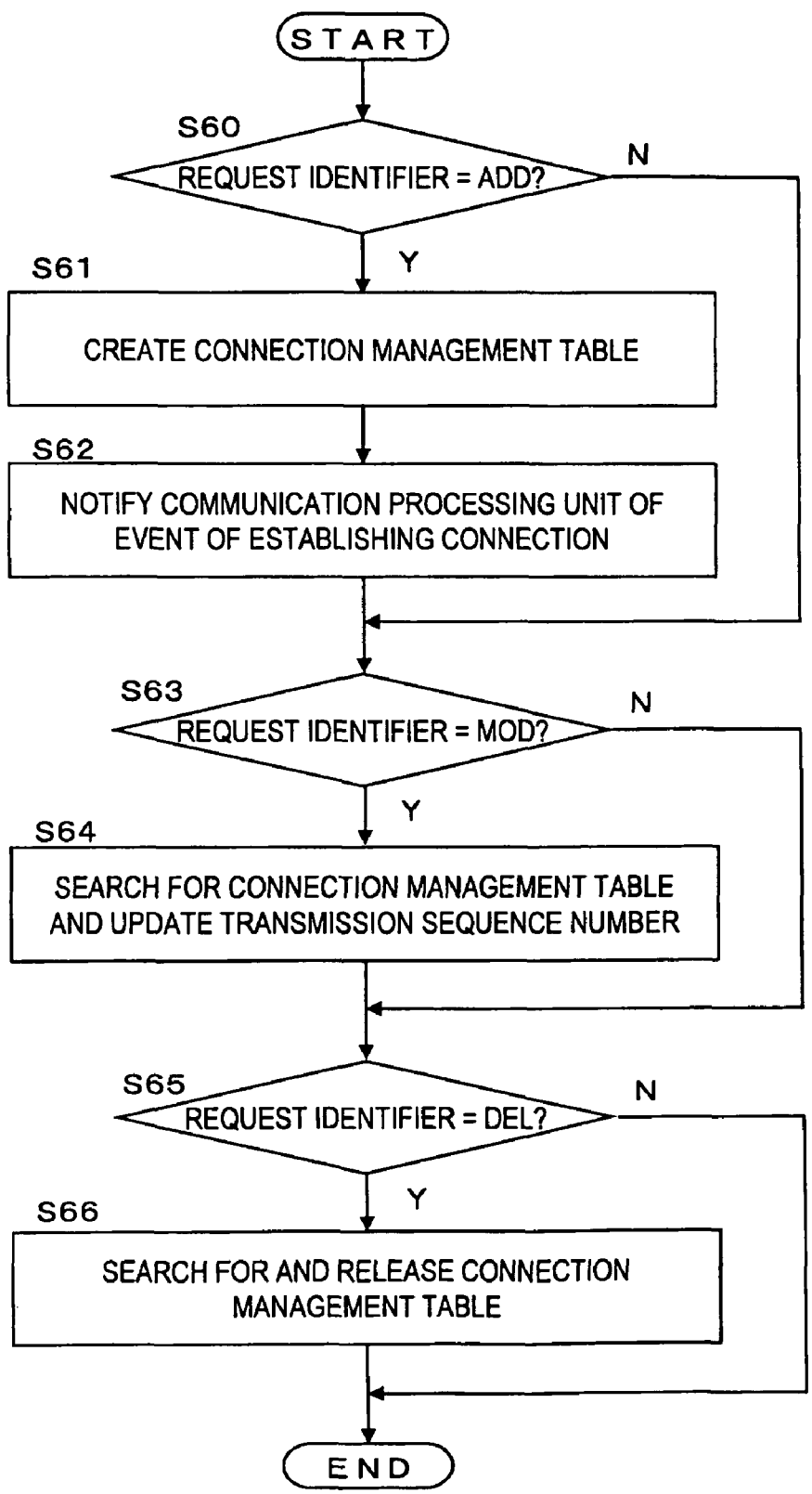
FIG. 18 is a processing flow of takeover processing of connection information on a standby side in the second example.
Figure 19:
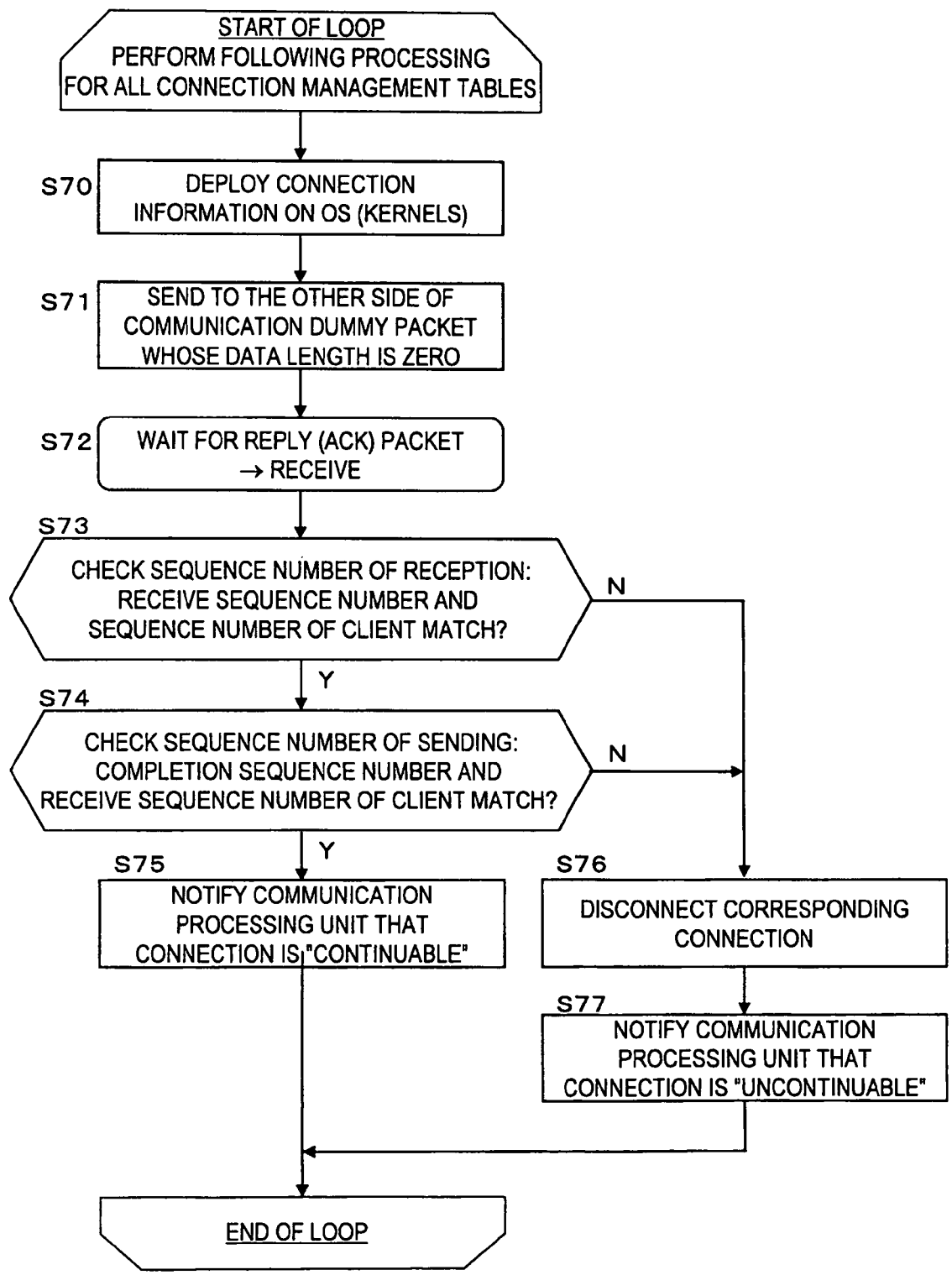
FIG. 19 is a processing flow of connection recovery processing in the second example.

FIGS. 17 to 19 are processing flow charts of the connection recovery device 1 in the second example.

FIG. 17 is a processing flow of takeover processing of connection information on an active side.

In the first apparatus 10a, the connection information takeover unit 2a of the connection recovery device 1a checks whether a connection has been established in the protocol control unit 12a (step S50). Only if it is detected that a connection has been established in the protocol control unit 12a (Y on the step S50), the connection information takeover unit 2a creates a connection management table illustrated in FIG. 14 (step S51). Furthermore, the connection information takeover unit 2a generates takeover information at a time of establishing a connection (a request identifier=ADD; data of a connection management table) illustrated in FIG. 15A, and asks the redundancy control unit 11a to transmit the takeover information to the connection recovery device 1s of the second apparatus 10s. The connection management table is taken over to the connection recovery device 1s via the redundancy control units 11a and 11s (step S52)

The connection information takeover unit 2a checks whether data has been sent in the protocol control unit 12a (step S53). If data has been sent in the protocol control unit 12a (Y on the step S53), the redundancy control unit 11a updates a completion sequence number (write_seq) for a length of data which was requested to be sent (step S54). The connection information takeover unit 2a acquires a connection identifier, a transmission sequence number (a sequence number and an acknowledgement number) and a completion sequence number (write_seq) of data sending, generates takeover information at a time of transmitting data (a request identifier=MOD; a connection identifier of data that has passed through; a transmission sequence number of that data; a completion sequence number) illustrated in FIG. 15B, and asks the redundancy control unit 11a to transmit the generated takeover information to the connection recovery device 1s (step S55).

If data has not been sent in the protocol control unit 12a (N on the step S53), the processing goes to step S56.

The connection information takeover unit 2a checks whether data has been received in the protocol control unit 12a (step S56). If data has been received in the protocol control unit 12a (Y on the step S56), the connection information takeover unit 2a checks whether a receive buffer exists in the redundancy control unit 11a (step S57). If a receive buffer does not exist in the redundancy control unit 11a (N on the step S57), the connection information takeover unit 2a acquires a connection identifier, a transmission sequence number (a sequence number and an acknowledgement number) and a completion sequence number (write_seq) of data reception via the protocol control unit 12a, generates takeover information at a time of detecting data (a request identifier=MOD; a connection identifier of data that has passed through; a transmission sequence number of that data; a completion sequence number) illustrated in FIG. 15B, and asks the redundancy control unit 11a to transmit the generated takeover information to the connection recovery device 1s (step S58).

If data has not been received in the protocol control unit 12a (N on the step S56) or a receive buffer exists in the redundancy control unit 11a (Y on the step S57), the processing goes to step S59.

The connection information takeover unit 2a checks whether a connection has been released in the protocol control unit 12a (step S59). If it is detected that a connection has been released in the protocol control unit 12a (Y on the step S59), the connection information takeover unit 2a generates takeover information at a time of releasing a connection (a request identifier=DEL; a connection identifier of a released connection) illustrated in FIG. 15C and asks the redundancy control unit 11a to transmit the takeover information to the connection recovery device 1s (step S510).

FIG. 18 is a processing flow of takeover processing of connection information on a standby side.

In the second apparatus 10s, the connection information takeover unit 2s of the connection recovery device 1s checks a request identifier of takeover information received via the redundancy control unit 11s (step S60), and if the request identifier is ADD (Y on the step S60), creates a connection management table illustrated in FIG. 14 in accordance with the takeover information received to store in the connection information storing unit 3s (step S61). Furthermore, the connection information takeover unit 2s notifies the communication processing unit 13s of an event of establishing a connection (step S62).

Also, the connection information takeover unit 2s checks the request identifier of the takeover information received via the redundancy control unit 11s (step S63), and if the request identifier is MOD (Y on the step S63), searches for a connection management table of a corresponding connection and updates a transmission sequence number in accordance with received connection information (step S64).

Also, the connection information takeover unit 2s checks the request identifier of the takeover information received via the redundancy control unit 11s (step S65), and if the request identifier is DEL (Y on the step S65), searches for and releases a connection management table of a corresponding connection (step S66).

FIG. 19 is a processing flow of connection recovery processing.

In the second apparatus 10s which is notified of switching to active, the connection recovery device 1s performs processing of steps S70 to S77 for all connection management tables stored in the connection information storing unit 3s.

The protocol control unit 12s deploys connection information (a connection management table) on an OS (kernels) (step S70). The dummy data sending unit 5s sends to the client 20, which is the other side of the communication, a dummy packet illustrated in FIG. 6 whose data length is zero (step S71). The connection recovery device 1s waits for and receives a reply (ACK) packet illustrated in FIG. 7 from the client 20 (step S72).

The connection continuity determining unit 6s checks whether a send sequence number (seq) of the reply packet matches with a receive sequence number in a connection management table illustrated in FIG. 14 (step S73). If the send sequence number of the reply packet matches with the receive sequence number in the connection management table (Y on the step S73), the connection continuity determining unit 6s further checks whether a receive sequence number (ack) of the reply packet matches with a completion sequence number in the connection management table (step S74).

If the receive sequence number of the reply packet matches with the completion sequence number in the connection management table (Y on the step S74), the communication processing unit 13s is notified that the connection is "continuable" (step S75).

On the other hand, if the connection continuity determining unit 6s determines that the send sequence number of the reply packet does not match with the receive sequence number in the connection management table (N on the step S73) or that the receive sequence number of the reply packet does not match with the completion sequence number in the connection management table (N on the step S74), the protocol control unit 12s disconnects a corresponding connection (step S76). The connection continuity determining unit 6 notifies the communication processing unit 13s that the connection is "uncontinuable" (step S77).

Although the present invention has been described in accordance with embodiments thereof, it is obvious that the present invention may be modified in various ways within the spirit and scope of the present invention. For example, in the processing of FIG. 19, the processing of the step S74 may be performed before the processing of the step S73.

Also, the connection information takeover unit 2, the dummy data sending unit 5 and the connection continuity determining unit 6 of the connection recovery device 1 disclosed may be embodied as a program read and run by a computer. This program may be stored in an appropriate storage medium such as a portable medium memory, a semiconductor memory, a hard disk, etc. that are computer-readable, and is provided by storing in such a recording medium or by transmission that uses various communication networks via communication interfaces.

According to the present invention, complex programming for processing of checking sequentiality of packets in a communication processing unit at an application layer is no longer needed.

Thus, reliability and performance of TCP connection recovery processing performed when a failover occurs are increased.

For a user implementing a communication processing unit (a communication processing program), it is possible to increase reliability of a system by making it redundant as well as increase reliability and performance of TCP connection recovery processing performed when a failover occurs.

Also, because programming of a communication processing unit can be simplified, the number of man-hours needed for creating, testing, maintaining, etc. of a program can be reduced.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A connection recovery device for a redundant system in which apparatuses having a communication processing unit are redundantly configured, the connection recovery device being provided for each of the apparatuses and performing connection recovery processing when communication processing is switched between the apparatuses, the connection recovery device comprising:
    a connection information storing unit which stores connection information identifying a connection and a transmission sequence number appended to each data transmitted on the connection and indicates sequentiality of sending and receiving data;
    a connection information takeover unit which performs, if a local apparatus is in active state in which communication processing is being performed, processing that sends to the other apparatus in standby state in which communication processing is being waited connection information of a connection when the connection is established and sends the transmission sequence number appended to each data to the other apparatus when data transmission is performed on the connection and, if the local apparatus is in the standby state, processing that receives the connection information and the transmission sequence number to store in the connection information storing unit and notifies the communication processing unit of the local apparatus that the connection is established in accordance with the connection information;
    a dummy data sending unit which, when the local apparatus is notified of switching from the standby state to the active state, creates dummy data in accordance with connection information in the connection information storing unit and sends the dummy data to the other side of the connection; and
    a connection continuity determining unit which, when the local apparatus is notified of switching from the standby state to the active state, receives reply data for the dummy data sent, acquires a transmission sequence number appended to the reply data, and notifies the communication processing unit of the local apparatus that connection can be continued if the transmission sequence number of the reply data matches with the latest transmission sequence number stored in the connection information storing unit.

2. The connection recovery device for a redundant system according to claim 1, wherein
    the connection continuity determining unit disconnects the connection and notifies the communication processing unit of the local apparatus that connection cannot be continued if the transmission sequence number of the reply data does not match with the latest transmission sequence number stored in the connection information storing unit.

3. The connection recovery device for a redundant system according to claim 1, wherein,
    when data transmission performed on the connection is data reception of the local apparatus, the connection information takeover unit checks whether data exists in a receive buffer which temporally retains received data for the local apparatus at a timing of acquiring the transmission sequence number, and only if data does not exist in the receive buffer, acquires a transmission sequence number appended to data of the data reception to send to the other apparatus.

4. The connection recovery device for a redundant system according to claim 1, wherein,
    when data transmission performed on the connection is data sending of the local apparatus, the connection information takeover unit records a completion sequence number which indicates an amount of data to be sent in the data sending using a sequence number, and sends a transmission sequence number appended to data of the data sending and the completion sequence number to the other apparatus.

5. The connection recovery device for a redundant system according to claim 4, wherein
    the connection continuity determining unit acquires the transmission sequence number appended to the reply data, and if a receive sequence number of the reply data matches with a completion sequence number stored in the connection information storing unit and a send sequence number of the reply data matches with a receive sequence number stored in the connection information storing unit, notifies the communication processing unit of the local apparatus that connection can be continued.

6. A connection recovery processing method for a redundant system in which apparatuses having a communication processing unit are redundantly configured, the connection recovery processing method being provided for each of the apparatuses and performed by the apparatuses when communication processing is switched between the apparatuses, the connection recovery processing method comprising:
    a step for a first apparatus in active state in which communication processing is being performed of sending connection information of a connection to a second apparatus in standby state when the connection is established;
    a step for a second apparatus in standby state in which communication processing is being waited of receiving the connection information from the first apparatus to store in a connection information storing unit;
    a step for the second apparatus of notifying the communication processing unit thereof that the connection is established;
    a step for the first apparatus of sending to the second apparatus a transmission sequence number which is appended to data being transmitted on the connection and indicates sequentiality of sending and receiving data;
    a step for the second apparatus of storing the sequence number in the connection information storing unit;
    a step for the second apparatus, when notified of switching from the standby state to the active state, of creating dummy data in accordance with connection information in the connection information storing unit and sending the dummy data to the other end of the connection; and
    a step for the second apparatus, when notified of switching from the standby state to the active state, of receiving reply data for the dummy data sent, acquiring a transmission sequence number appended to the reply data, and notifying the communication processing unit thereof that connection can be continued if the transmission sequence number of the reply data matches with the latest transmission sequence number stored in the connection information storing unit.

7. A non-transitory computer-readable medium storing therein a processing program for causing a redundant system in which apparatuses having a communication processing unit are redundantly configured to perform connection recovery processing when processing is switched between the apparatuses, wherein each of the apparatuses comprises a connection information storing unit which stores connection information identifying a connection and a transmission sequence number appended to data transmitted on the connection and indicating sequentiality of sending and receiving data and the program causes the apparatuses function as:

a connection information takeover unit which performs, if a local apparatus is in active state in which communication processing is being performed, processing that sends to the other apparatus in standby state in which communication processing is being waited connection information of a connection when the connection is established and sends the transmission sequence number appended to each data to the other apparatus when data transmission is performed on the connection, and, if the local apparatus is in the standby state, processing that receives the connection information and the transmission sequence number to store in the connection information storing unit and notifies the communication processing unit of the local apparatus that the connection is established in accordance with the connection information received;

a dummy data sending unit which, when the local apparatus is notified of switching from the standby state to the active state, creates dummy data in accordance with connection information in the connection information storing unit and sends the dummy data to the other side of the connection; and a connection continuity determining unit which, when the local apparatus is notified of switching from the standby state to the active state, receives reply data for the dummy data sent, acquiring a transmission sequence number appended to the reply data, and notifies the communication processing unit of the local apparatus that connection can be continued if the transmission sequence number of the reply data matches with the latest transmission sequence number stored in the connection information storing unit.

* * * * *